(12) United States Patent
Dalton

(10) Patent No.: US 8,341,110 B2
(45) Date of Patent: Dec. 25, 2012

(54) TEMPORAL-INFLUENCED GEOSPATIAL MODELING SYSTEM AND METHOD

(75) Inventor: Jason R. Dalton, Vienna, VA (US)

(73) Assignee: GeoEye Analytics Inc., Dulles, VA (US)

( * ) Notice: Subject to any disclaimer, the term of this patent is extended or adjusted under 35 U.S.C. 154(b) by 144 days.

(21) Appl. No.: 13/073,327

(22) Filed: Mar. 28, 2011

(65) Prior Publication Data

US 2011/0191284 A1    Aug. 4, 2011

Related U.S. Application Data

(63) Continuation-in-part of application No. 11/978,449, filed on Oct. 29, 2007, now Pat. No. 7,917,458, which is a continuation-in-part of application No. 11/098,510, filed on Apr. 4, 2005, now Pat. No. 7,346,597.

(51) Int. Cl.
*G06F 17/00*    (2006.01)
*G06N 7/00*    (2006.01)
*G06N 7/08*    (2006.01)

(52) U.S. Cl. ................................................ 706/58

(58) Field of Classification Search .................. 706/58
See application file for complete search history.

(56) References Cited

U.S. PATENT DOCUMENTS

| | | | |
|---|---|---|---|
| 6,490,519 B1 * | 12/2002 | Lapidot et al. | 701/117 |
| 6,532,414 B2 * | 3/2003 | Mintz | 701/117 |
| 6,542,808 B2 * | 4/2003 | Mintz | 701/117 |
| 6,917,982 B1 * | 7/2005 | Dueck et al. | 709/235 |
| 7,571,146 B2 * | 8/2009 | Dalton | 706/45 |
| 7,577,554 B2 * | 8/2009 | Lystad et al. | 703/2 |
| 7,801,842 B2 * | 9/2010 | Dalton | 706/58 |
| 7,917,458 B2 * | 3/2011 | Dalton | 706/46 |

* cited by examiner

*Primary Examiner* — Michael B Holmes
(74) *Attorney, Agent, or Firm* — Williams Mullen PC; Thomas F. Bergert

(57) ABSTRACT

A temporal-influenced geospatial modeling system and method forecasts the likelihood of desirable and undesirable events. In one aspect, the present invention designates at least one temporal feature, determines an intensity function representing an expected value of event type instances corresponding to the temporal feature, determines a time window break associated with the intensity function and assesses whether the time window break is a critical time point for the event type.

14 Claims, 34 Drawing Sheets

FIG. 6

TEMPORAL-INFLUENCED GEOSPATIAL MODELING SYSTEM AND METHOD

REFERENCE TO RELATED APPLICATIONS

This application is a continuation-in-part application of U.S. non-provisional patent application Ser. No. 11/978,449, filed Oct. 29, 2007 now U.S. Pat. No. 7,917,458, entitled "Temporal-influenced Geospatial Modeling System and Method", which is a continuation-in-part application of U.S. non-provisional patent application Ser. No. 11/098,510, filed Apr. 4, 2005, now U.S. Pat. No. 7,346,597 and entitled "Method and System for Event and Result Prediction based on Geospatial Modeling", the disclosures of which are incorporated herein by reference.

TECHNICAL FIELD

The present invention relates to spatial modeling, and more particularly provides a computer-implemented, temporal-influenced geospatial modeling system and method associated with events and event-types that assists in forecasting occurrences of identifiable events and/or results.

BACKGROUND ART

Geospatial modeling offers an approach to solutions to a variety of corporate, governmental and individual problems. For example, when a law enforcement or fire department agency seeks to analyze or react efficiently to crimes or fires, respectively, geospatial modeling might be used to locate the nearest water sources to quell the fire, or to locate the nearest police stations for personnel dispatch. As another example, when a retail chain seeks a location to open a new store, geospatial modeling might be used to determine most viable location based on available demographic information.

Geospatial information modeling has increased the ability to forecast events, threats and results, as described, for example, in U.S. Application Publication No. 2005/0222829. However, it is often desirable to not only forecast or predict behavioral outcomes, but to influence them as well. No previous systems are known which can model information geospatially so as to assist in spatial behavior modification, e.g., influencing human behavior. No previous systems use geospatial modeling as disclosed by the present invention to assess not only where an arsonist might act next, for example, but how to influence a known, but not captured, arsonist to attempt arson in a specific geospatial and even temporal environment (i.e., at a specific place and time).

Typical of past systems is to predict a location of a future occurrence of a given incident-type by simply analyzing the location of the past similar incidents. Further, past systems are limited in that they do not simultaneously allow for rapid assessment determinations with increased accuracy. Further, past systems make no effort to account for temporal aspects of events and event-types as they relate to the geospatial environment.

DISCLOSURE OF INVENTION

The present invention, in part, considers geographical features and multiple types of measurements connecting past incidents to those features as part of an overall system and method for rapidly and accurately assessing likelihoods of future events or results. The present invention builds upon the assessed likelihoods through an influence element for analyzing most relevant variables, assessing their individual and combined abilities to influence the event or result type, and initiating a real-world response based on the assessment in order to increase the chances of positively affecting or influencing real-world behavior. In one embodiment, the present invention considers past data associated with several event-types in order to arrive at an assessment. The real-world response can be a computer simulation offering options for a real world response, a report offering suggestions with cost/time analysis, or a physical or informational action resulting/communicated directly from the assessment, for example.

The present invention assists in forecasting occurrences of identifiable events and/or results. In one aspect, the present invention designates at least one temporal feature, determines an intensity function representing an expected value of event type instances corresponding to the temporal feature, determines a time window break associated with the intensity function and assesses whether the time window break is a critical time point for the event type.

BRIEF DESCRIPTION OF DRAWINGS

FIG. 6 shows the sample diagram of FIG. 3 with points illustrating past event data in accordance with an illustrative example of employing the present invention as described in the specification.

FIGS. 13B through 18 show sample representations of a geographical boundary and elements employed in providing an assessment in accordance with one embodiment of the present invention.

MODES FOR CARRYING OUT THE INVENTION

Figure 1:
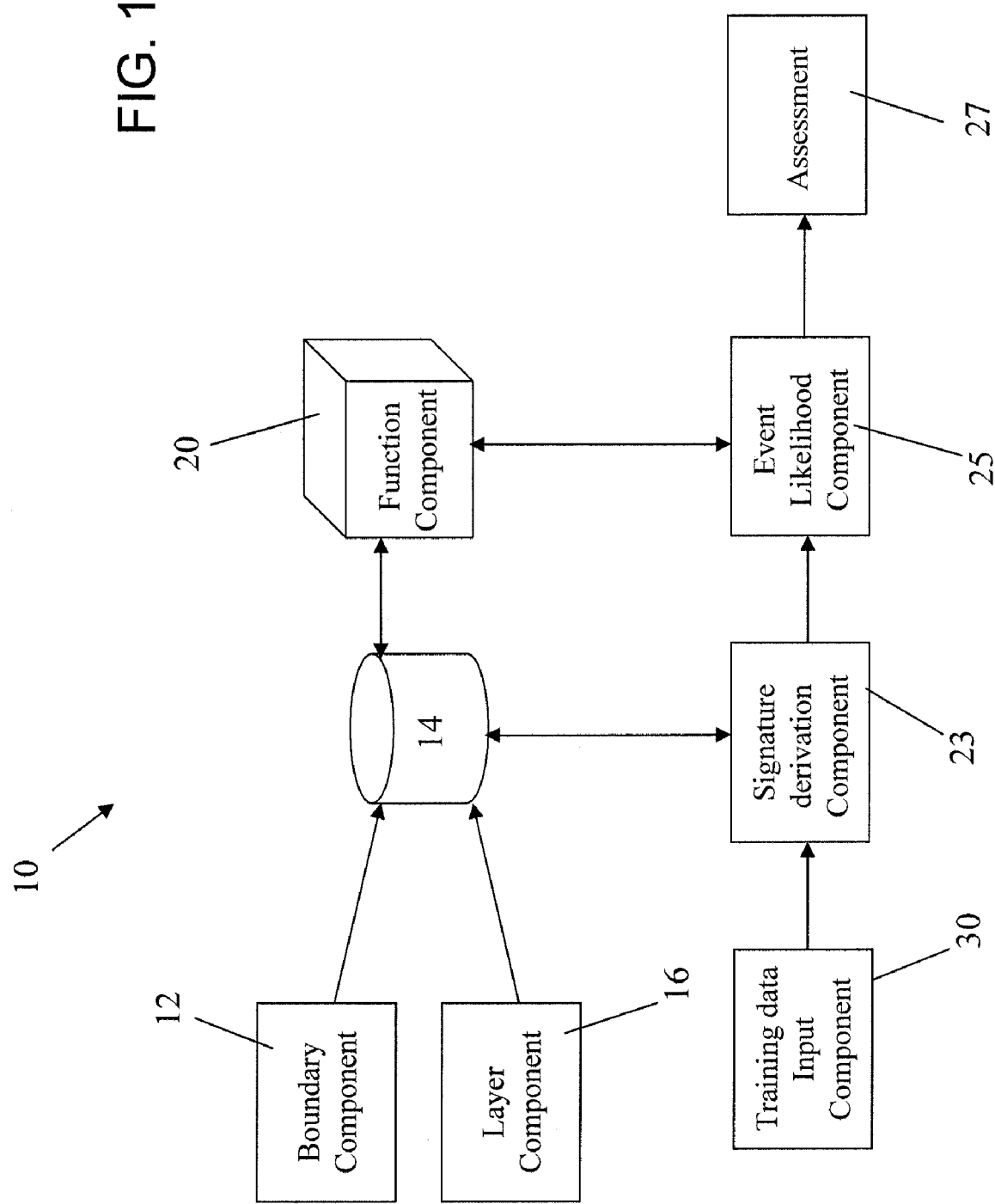
FIG. 1 shows a block diagram illustrating the interaction of several components of one embodiment of the present invention.
Figure 4:
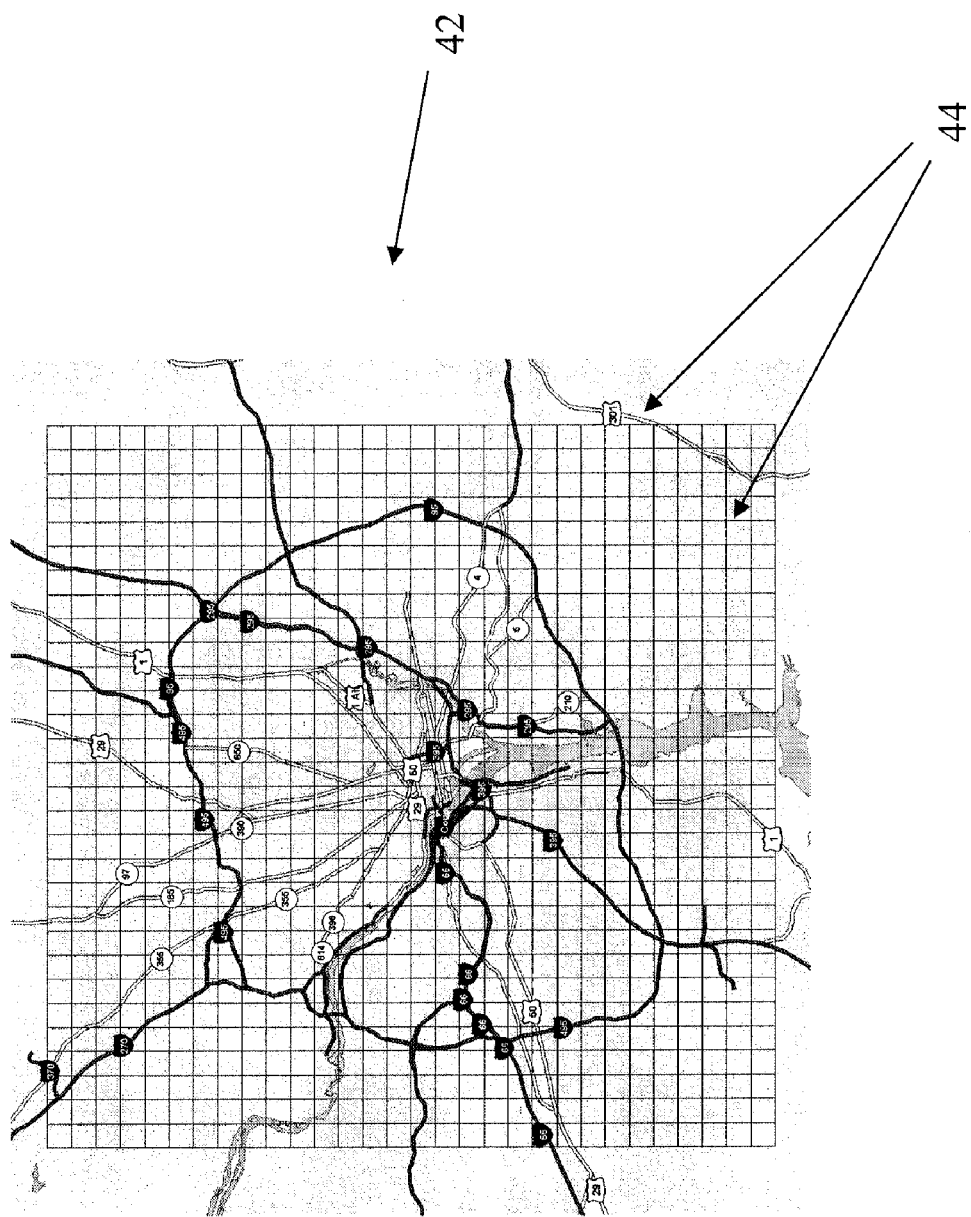
FIG. 4 shows the diagram of FIG. 3 with a grid overlay.

As shown in FIG. 1, the present invention provides a system 10 including a boundary component 12 which allows the system or a user to set forth or incorporate a geospatial boundary to be analyzed in accordance with the present invention. The boundary component also can specify individual cells within the boundary. Cells can be provided in a grid overlay such as shown in FIG. 4, with each cell being a regular and square-shaped element in a square- or rectangular-shaped grid. Alternatively, the cells can be provided in irregular shapes, such as shown in FIG. 13B, where as an example the cell boundaries are defined as the county boundaries in Maryland. Such irregular shapes can be dictated by political boundaries, natural boundaries, system- or user-created boundaries, or randomly. In one embodiment, boundary information and cell information can be stored in database 14 for one or more areas of interest.

The layer component 16 allows the system or a user to specify or incorporate one or more layers of geospatial features or characteristics pertaining to at least one variable of interest. For example, a "roads" layer may be provided having information pertaining to roads within the defined geospatial boundary. The roads layer may also be provided with additional variables of interest associated with roads, such as the number of lanes in a given road, whether the road is a highway or a city street, or whether the road is one-way or two-way, for example. Example types of layers can include: roads, cities, towns, cemeteries, embassies, gardens, industrial facilities, junctions, educational facilities, bodies of water, settlements, national parks, city or county facilities, bridges, hotels, fuel stations, hospitals, airports, train stations, parking lots, campsites, rest areas, archeological sites, and churches/holy places. Other layers can include information such as demographic information such as age, gender, income, and/or religion type, for example. It will be appreciated that the present invention can incorporate both static (e.g., bridges) and non-static (e.g., road construction locations, police speed traps, etc) variables. Layer and variable data are stored in spatial database 14. While boundary component 12 and layer component 16 are both shown in FIG. 1 as providing information to the same database 14, it will be appreciated that database 14 can be divided as necessary into multiple databases in order to accommodate the most suitable database architecture for a given system application, including temporal data as described more completely hereafter.

A function component 20 provides programming for identifying and measuring a functional measurement associated with an element or elements of each cell. For each cell, the function component can help determine a cell element from which measurements can be taken, as necessary. As shown in the regular cell example of FIG. 5, each square-shaped cell 44 has a middle point 54 derived from the known center of a square (i.e., the intersection of a vertical line drawn at the width halfway point with a horizontal line drawn at the length halfway point). As shown in the irregular cell example of FIG. 13B, each irregular cell can have a single cell element located at the center of mass or centroid of the cell (see points 302). Alternatively, the irregular-shaped cells can have multiple elements which assist in deriving more accurate values as described hereafter (see points 301). These multiple elements may be system-generated automatically, and may also be generated by the user or through some semi-automated process. It will be appreciated that high intra cell measurement variability leads to imprecise representation of the underlying statistical surface as a choropleth when a single cell element is used for measurement. Using multiple elements in each cell produces a more accurate representation of the statistical surface, and in the limit this leads to a asymmetric map with perfect representation of the surface.

Figure 5:
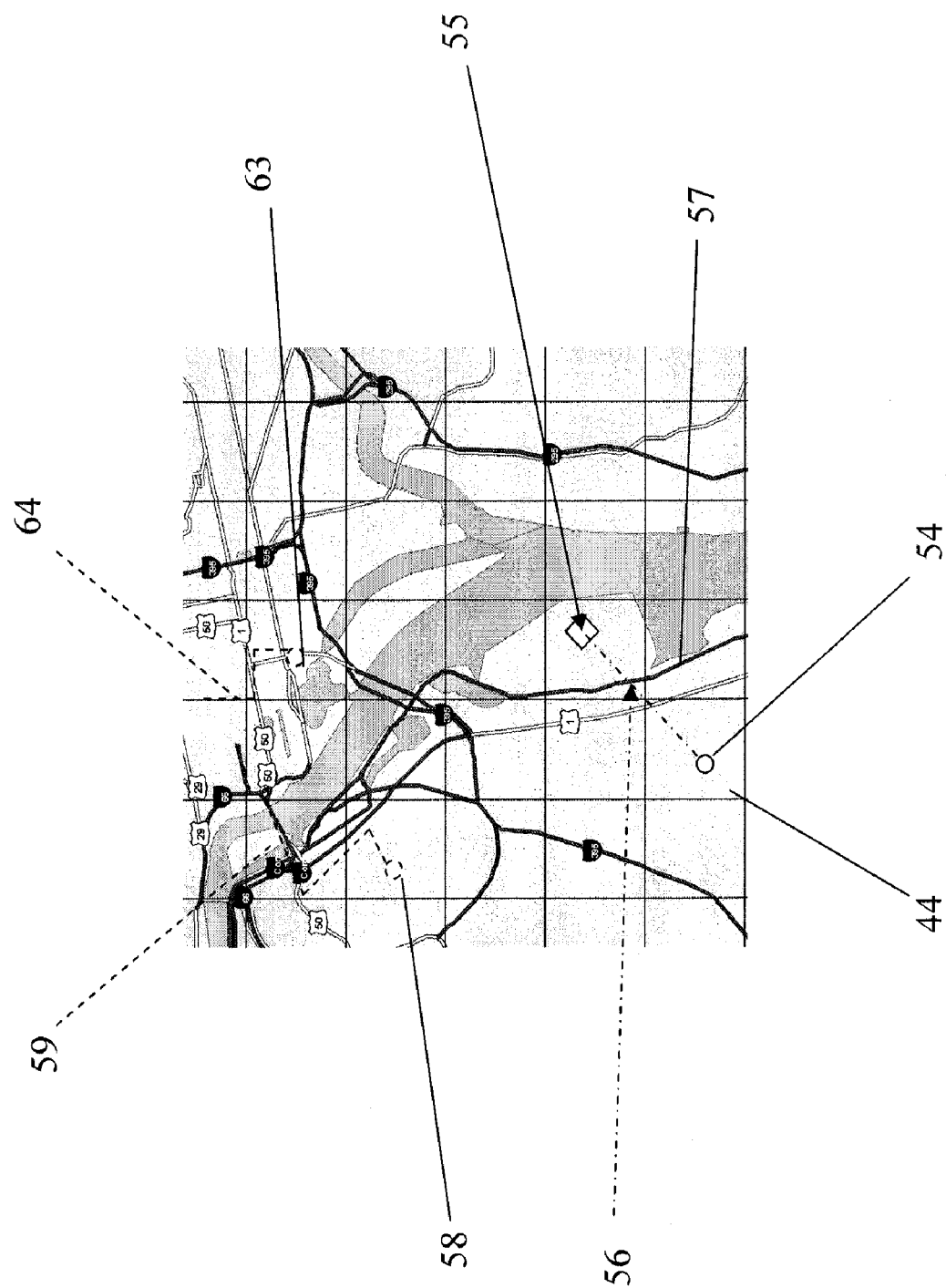
FIG. 5 shows a close-up segment of the diagram of FIG. 4 as an illustration of determining cell measurements in accordance with one embodiment of the present invention.

The function component can determine a measurement for each cell from the cell element (e.g., midpoint, centroid, etc.) to the variable of interest. In one embodiment, this measurement is the nearest neighbor distance. For example, as shown in FIG. 5, cell element is midpoint 54, the variable of interest can be airport 55, and the measured nearest neighbor value is distance 56. In another embodiment, this measurement is the nearest neighbor value. For example, as shown in FIG. 5, cell element is midpoint 54, the variable of interest is the number of lanes on the nearest road 57, and the nearest neighbor value is two (assuming road 57 has two lanes). In another embodiment, this measurement can be the density or concentration of a particular item. In still a further embodiment, this measurement is the average distance by actual path. For example, as shown in FIG. 5, actual path 59 can take into account the distance using actual roads from the cell element 58 to the variable of interest (e.g., a bridge crossing). In one embodiment, actual path can be considered based on artificial paths (e.g., man-made roads) as well as based on natural paths (e.g., a river or a clearing). In a further embodiment, the determined measurement is the Manhattan distance. For example, as shown in FIG. 5, cell element 63 can trace a Manhattan distance path 64 to variable of interest, and the distance along path 64 can be determined.

In a further embodiment the determined measurement is based on visibility. In this regard, the present invention employs a GIS function called a "viewshed", which gives the area visible along line of sight paths from a single point on the ground. The way the invention uses this is by including a 'has line of sight' calculation from an event to a feature. For example, if the events are animal poaching in a national park, each event could have a variable calculation on whether it is visible from a ranger tower in the park. This can be generalized to including the number of towers which are visible from each poaching event.

In another embodiment, the determined measurement is based on any type of function call to another computational function (e.g., a function derived programmatically by a third party), such that the results can be returned to the system for use in determining a signature. Thus, the invention is not limited to a probability density function or data sets that comprise a probability density function.

In yet a further example, the measurement is manually created. Wherein a user establishes a signature using information not derived from the invention. For example, the invention can allow the user to input via a user interface a generalized density function manually. In an illustrative embodiment, this function can take the form of a histogram, a continuous function of distance, or any values the user may require. The system will then validate and make scaling changes as necessary to ensure the probability density function is valid. For example, if the user knows that of the store locations he/she owns, 20% are two story, 30% are three story, and 50% are one story dwelling, a probability density function for number of floors in a store can be drawn on a GUI tool, entered into a table, or described with a function, for example.

Once all measurements are determined and calculations performed, the function component stores all measurements and calculations for later use when examining signature information associated with actual training data.

In one embodiment, layer component 16 includes an update layer element which operates to update the spatial database 14 upon receiving changes to existing layers or entirely new layers. The update layer element can trigger the layer component 16 to notify the function component 20 upon receipt of the updated or new layer, at which point the function component can either complete whatever current processing is occurring, or the function component can delay any further processing until the updated or new layer is incorporated. To the extent the new or updated layer is part of the currently processing assessment, the function component can re-initiate this segment of the analysis.

An event likelihood component (ELC) 25 performs analyses based on signatures constructed from available actual data received, for example, from an input component 30, to determine likelihood of similar events occurring in the geospatial boundary. The event data can be, for example, locations where previous armed robberies occurred. A signature derivation component 23 receives the data, and measures and analyzes it against one or more of the layers entered in database for a given geospatial boundary. The signature derivation component 23 then constructs a raw signature, reduces the information into a histogram or probability density function (see, e.g., FIG. 7), and establishes a signature for this event type (e.g., armed robberies) within the geospatial boundary. The ELC 25 receives the derived signature from the signature derivation component 23, then combines the signature with the functional measurements stored by the function component regarding each cell, and thereby measures a level of signature match with one or more cells for the given event type. The level of signature match is an assessment 27 which can be determined by calculating a score associated with each cell. The scores can be plotted on a choropleth graph as shown in FIGS. 8 through 11, which can give a viewer a "hot spot" type reading, for example.

It will be appreciated that components 12, 16, 20, 23, 25 and 30 can be interconnected in a variety of configurations, such as by local area network, or wide area network such as the Internet, for example. Each component may comprise an individual server having a processor, memory and storage, or may comprise a programming element of multiple programs stored and executed on a single server, for example, as is known in the art. In one embodiment, various computationally intense aspects of the invention are distributed among multiple processors to promote efficiency and speed of the present invention.

Figure 2:
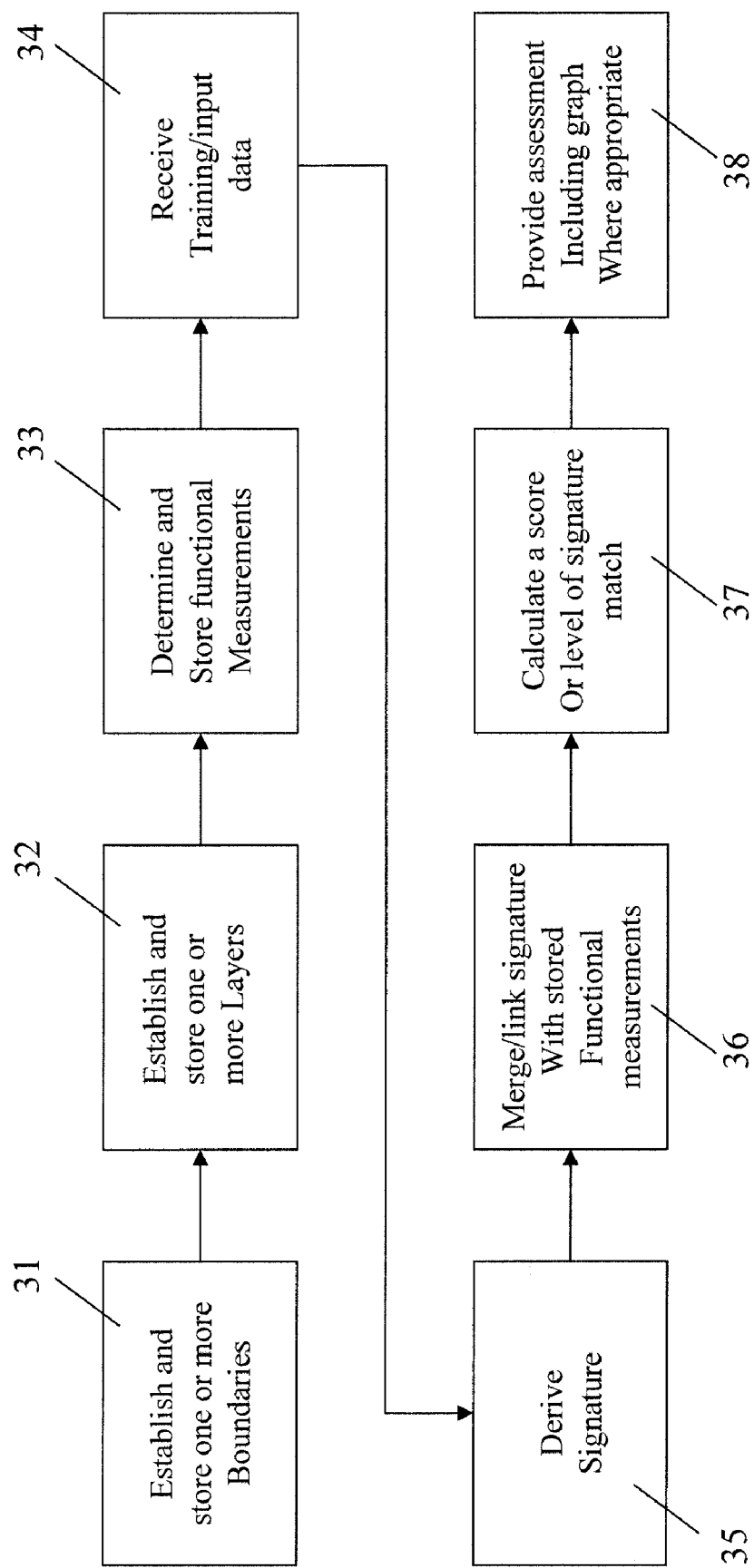
FIG. 2 is a block flow diagram illustrating steps taken in accordance with a forecasting method of one embodiment of the present invention.
Figure 3:
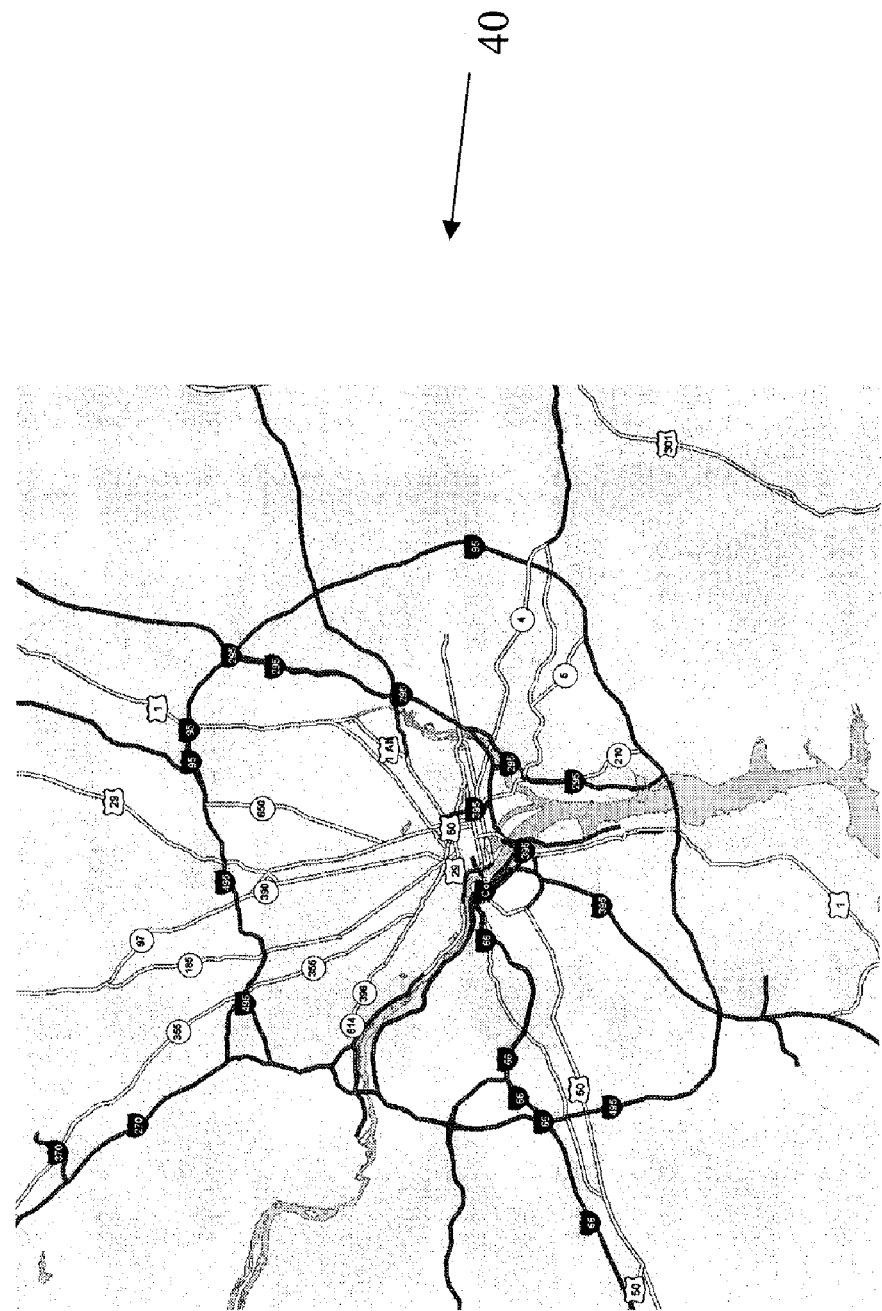
FIG. 3 is a sample diagram of an area of geographical interest in accordance with an illustrative embodiment of the present invention.

A method for employing the system of the present invention to arrive at a forecast or an assessment of a future event likelihood can occur as shown in FIG. 2, and a graphical representation of some of the steps described can appear as shown in FIGS. 3 through 11. As shown at 31 in FIG. 2, and 40 in FIG. 3, a geospatial boundary can be defined, such as a 20 mile by 20 mile square area around Washington, D.C. Within this boundary, a grid 42 of smaller geographical areas (i.e., cells 44) can be created within the boundary, as shown in FIG. 4. As shown within the boundary, one or more layers having "variables of interest" (e.g., schools, roads, rivers, convenience stores, etc.) can be established. These layers can be thematic data sources and the establishment and input of one or more of these layers corresponds to step 32 in FIG. 2. In the particular example of FIG. 5, an airport (Reagan National Airport) is shown as at 55, along with some rivers 53 and roads 57.

Next, proximity or functional measurements are derived and stored for each cell and for each variable of interest, as indicated at step 33. For example, as part of the method of the present invention, for each cell 44, a proximity measure can be determined for each of the different variables of interest. Using cell 44 in FIG. 5 as an example, there is a straight line proximity measure (proximity SL) 56 between the midpoint or training point 55 of cell 44 and the airport 55. A proximity (or nearest neighbor) SL measurement can be stored for each cell against each variable of interest. It will be appreciated that the present invention contemplates straight line proximity measurements as well as alternative proximity measurements, such as proximity by road traversal, proximity by time of travel, proximity by time of travel using motorized vehicle, by an adult or child walking, by an adult or child running, and so forth.

The invention further contemplates functional measurements such as described above to accommodate non-proximity or non-nearest neighbor evaluations. Other factors which can be considered in addition to proximity include natural measures, such as temperature, time, cost surface distance, elevation, wind speed, precipitation, tidal information, pressure, humidity, luminance or slope, for example. Still other factors can include feature density, or demographics such as ethnic populations and population density. These types of factors can be considered "continuous" factors, to be described more completely elsewhere herein. As opposed to continuous factors, the present invention can also consider "discrete" factors or variables, such as certain demographics like predominant religion or predominant ethnic group, for example. Other discrete factors the present invention can consider include land utilization, zoning and/or predominant vegetation.

As a specific example, cost surface distance considers the actual or projected cost of traversing a distance. For example, traversing a section of white water rapids may be most directly possible (i.e., involving the shortest actual distance) by boarding a gondola or similar vehicle, but if the vehicle ride incurs greater financial costs than if one were to traverse a downstream bridge, then the cost surface distance of the vehicle ride would be greater than the cost distance to take the downstream bridge. In one aspect of the invention, a nearest neighbor distance (NND) cost surface factor type function (FTF) calculates the distance to a feature according to a cost surface. The inputs to this FTF are a feature layer (e.g., churches, shopping centers, rail stations) and a raster layer that models the "friction" associated to the travel on the feature layers. The friction layer can be modeled from input data such as terrain, transportation, weather and financial cost, for example. The friction surface in turn provides a field where the path of least resistance is calculated between a location and a specific destination (the feature data). The result provided by the present invention is a cost FTF that permits the calculation of "distance" in terms of non-Euclidean units (e.g., time and money). Such a result reflects the perspectives of human nature and how they travel and arrive at access to goods and services most efficiently. In one embodiment of the present invention, any impassable location can be assigned a negative value in the cost surface. Thus, if an AOI grid point or event point falls on an impassable cost cell or an unreachable island, for example, the raw factor data (RFD) will receive a null value and that point for the purposes of the specific factor will be excluded from the assessment entirely. It will be appreciated that, in one embodiment of the present invention, Geospatial Data Abstraction Library (GDAL)-supported raster files can be input as AOI grid values through an import procedure as is known in the art. Other valid cost surface input formats can include, for example, ERDAS Imagine™, ESRI ASCII Grid and TIF formats, as well as other raster imagery formats.

Figure 6:
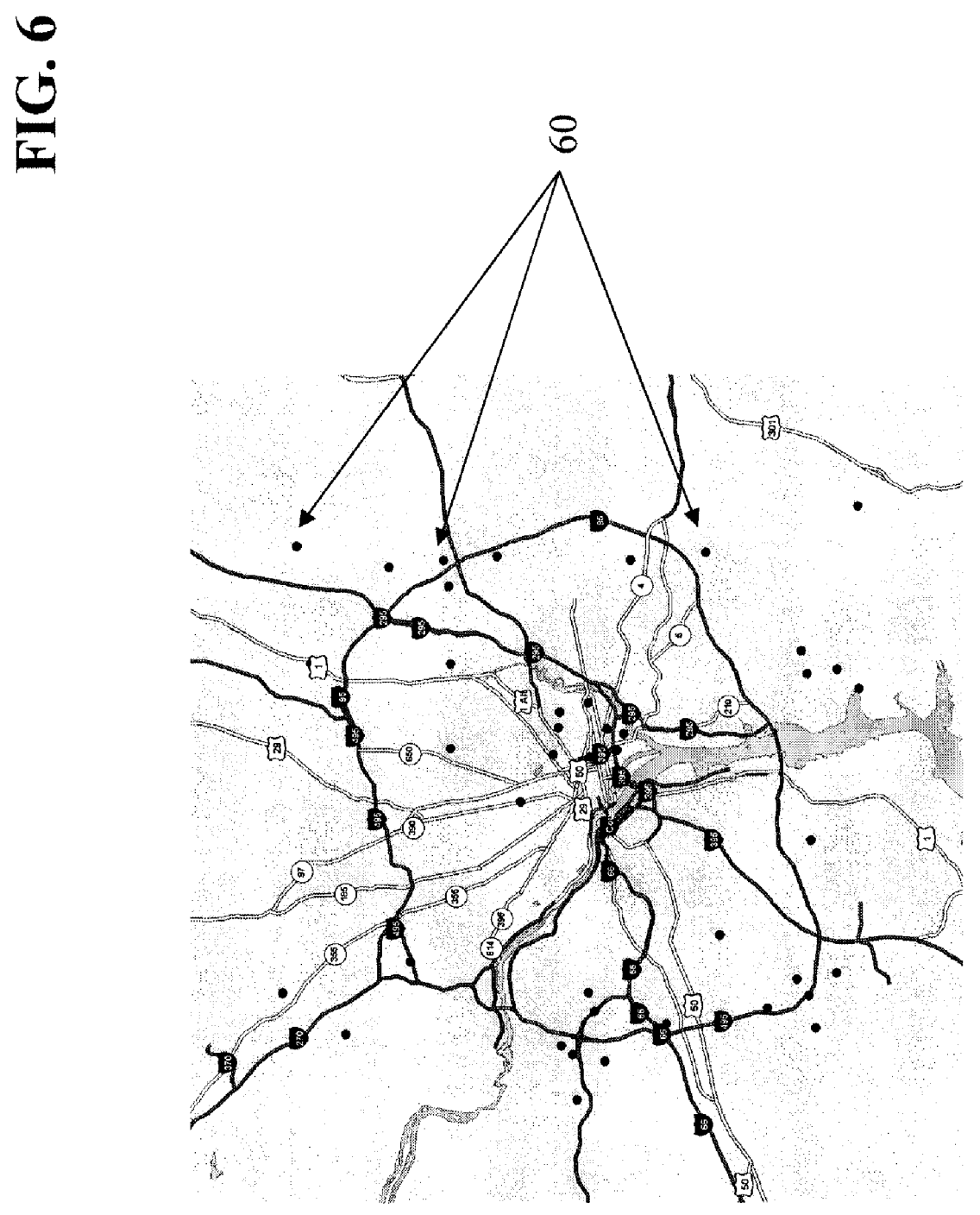

Once each cell has been measured according to the appropriate factor for the problem to be solved or event to be forecasted, the present invention can receive information pertaining to a location of a meaningful event or events (e.g., a robbery), as indicated at 34 in FIG. 2. The location information can be specified by block and street (e.g., 4400 block of Hill St.), by latitude and longitude, or other known format. As shown in FIG. 6, events can be designated by black dots 60.

Next, the invention can identify the proximity of the event to the variables of interest (e.g., the robbery occurred 0.2 miles from a convenience store, 0.5 miles from a highway, and 2 miles from a river). Based on the identified location, proximity to variables of interest can be determined, much like was done for each cell.

Next, the invention can establish a "raw signature" for the event. For example, if five events (robberies) occur and there are two variables (highway, river), the raw signature might look like that in Table 1 below:

TABLE 1

| Event # | Variable # | Calculation | Special/Feature ID |
|---------|------------|-------------|--------------------|
| 1 | 1 (highway) | 0.2 km | 55 |
| 2 | 1 | 0.1 km | 55 |
| 3 | 1 | 1 km | 443 |
| 4 | 1 | 0.7 km | 618 |
| 5 | 1 | 0.15 km | 99 |
| 1 | 2 (river) | 4 km | 12 |
| 2 | 2 | 2 km | 12 |
| 3 | 2 | 7 km | 12 |
| 4 | 2 | 1.2 km | 12 |
| 5 | 2 | 5 km | 12 |

It will be appreciated that the special/feature ID shown in column 4 can be an identifier for the highway (e.g., 55 can be Rte. 95, 443 can be Rte. 66, etc.) or other variable.

Figure 7:
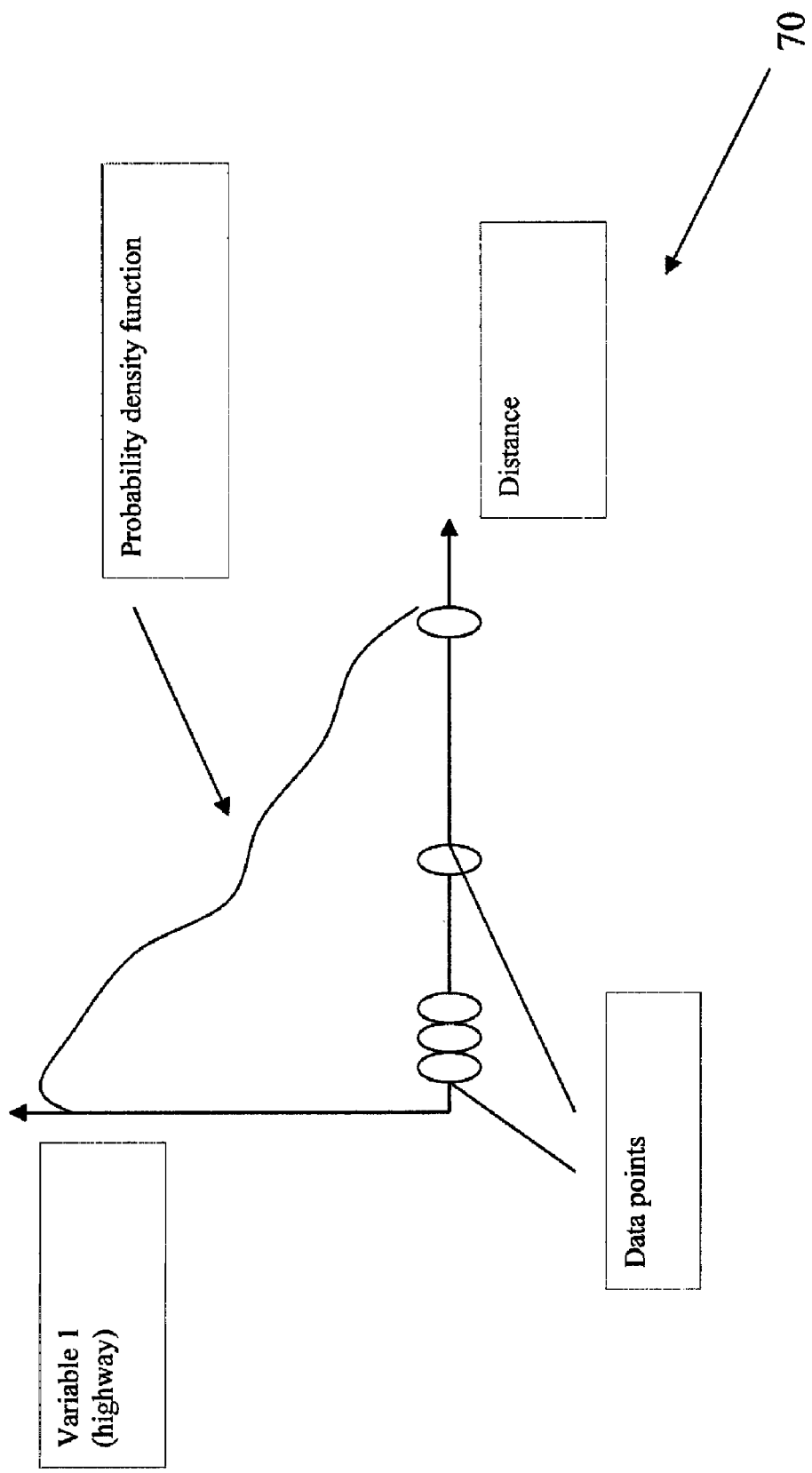
FIG. 7 is an example probability density function in accordance with an illustrative example of employing the present invention as described in the specification.
Figure 8:
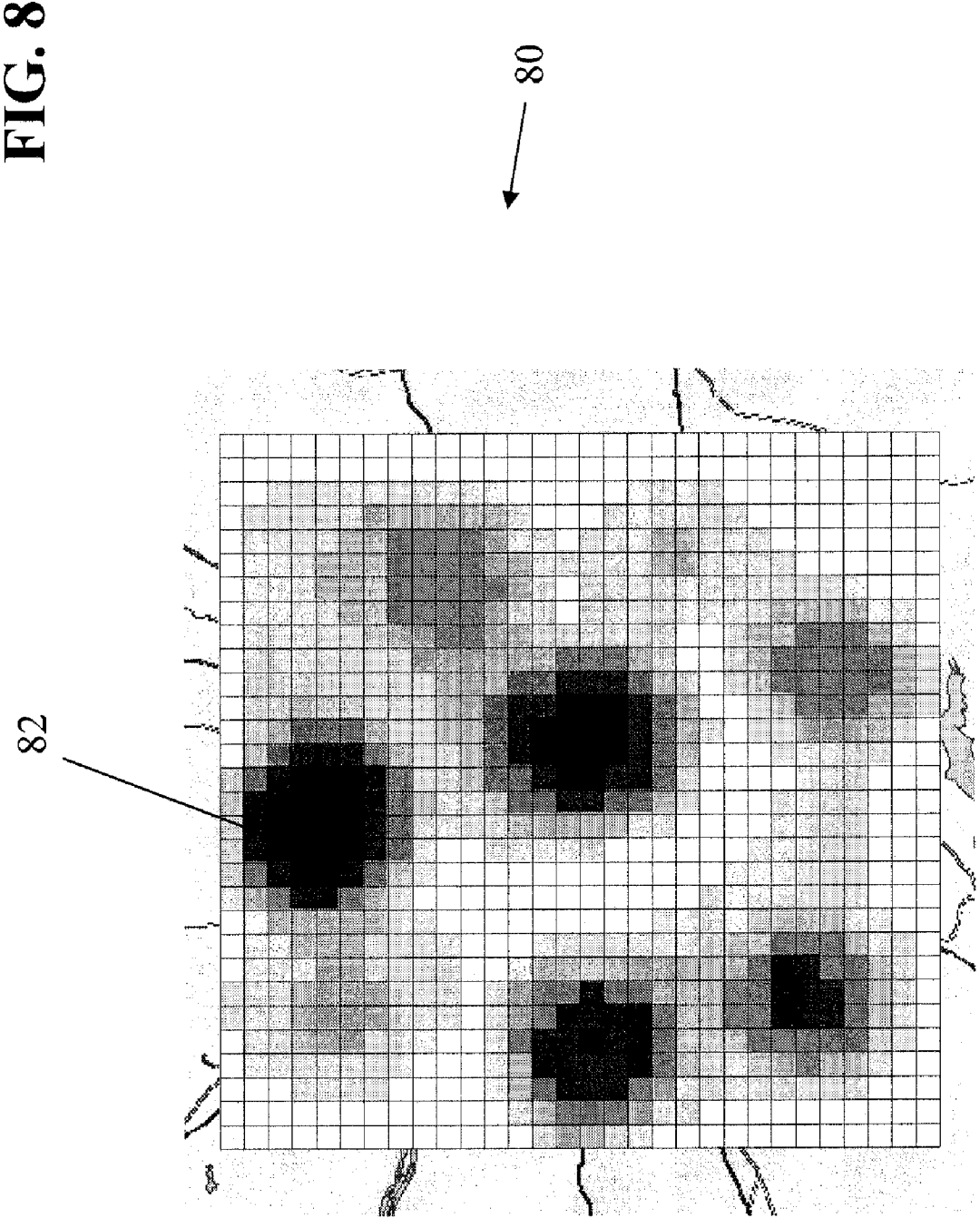
FIGS. 8 through 11 are example diagrams showing graphical "hot spot" representations according to various embodiments of the present invention.

Next, the invention can measure a probability density function for each variable, so as to have a probability associating the events with a variable of interest, as shown by the example graphical representation 70 in FIG. 7. In this example, the five data points from item 7 represent the distance of the five robbery events from a highway. In three cases, the robbery was very close to a highway. One case was somewhat close, and another case was more distant from the highway. The probability density function is performed for all events against each variable individually. While the representation in FIG. 7 is a continuous probability density function, it will be appreciated that histogram-type probability density functions can be provided in connection with discrete variables, such as those identified above (e.g., predominant religion or ethnic group demographics, land utilization, zoning, predominant vegetation, etc.).

Once this is done, a refined signature based on the probability density function can be established. In one embodiment of the invention, the probability density functions can be converted into a binary file, which can then be used in each of the cells outlined above. The processing of the event data from input to a signature is illustrated at step 35 in FIG. 2, for example. At step 36, the event signature is compared with the cell signatures previously determined and stored at step 33.

Next, for each of the cells, a score indicative of that cell's compatibility with the refined signature can be determined, as at 37 in FIG. 2. Each cell will have a probability score associated with each variable. In one case, the total score can be the sum of each of the probability scores. In other cases, coefficients can be provided to assign weights to different variables as described hereafter.

Figure 9:
Figure 10:
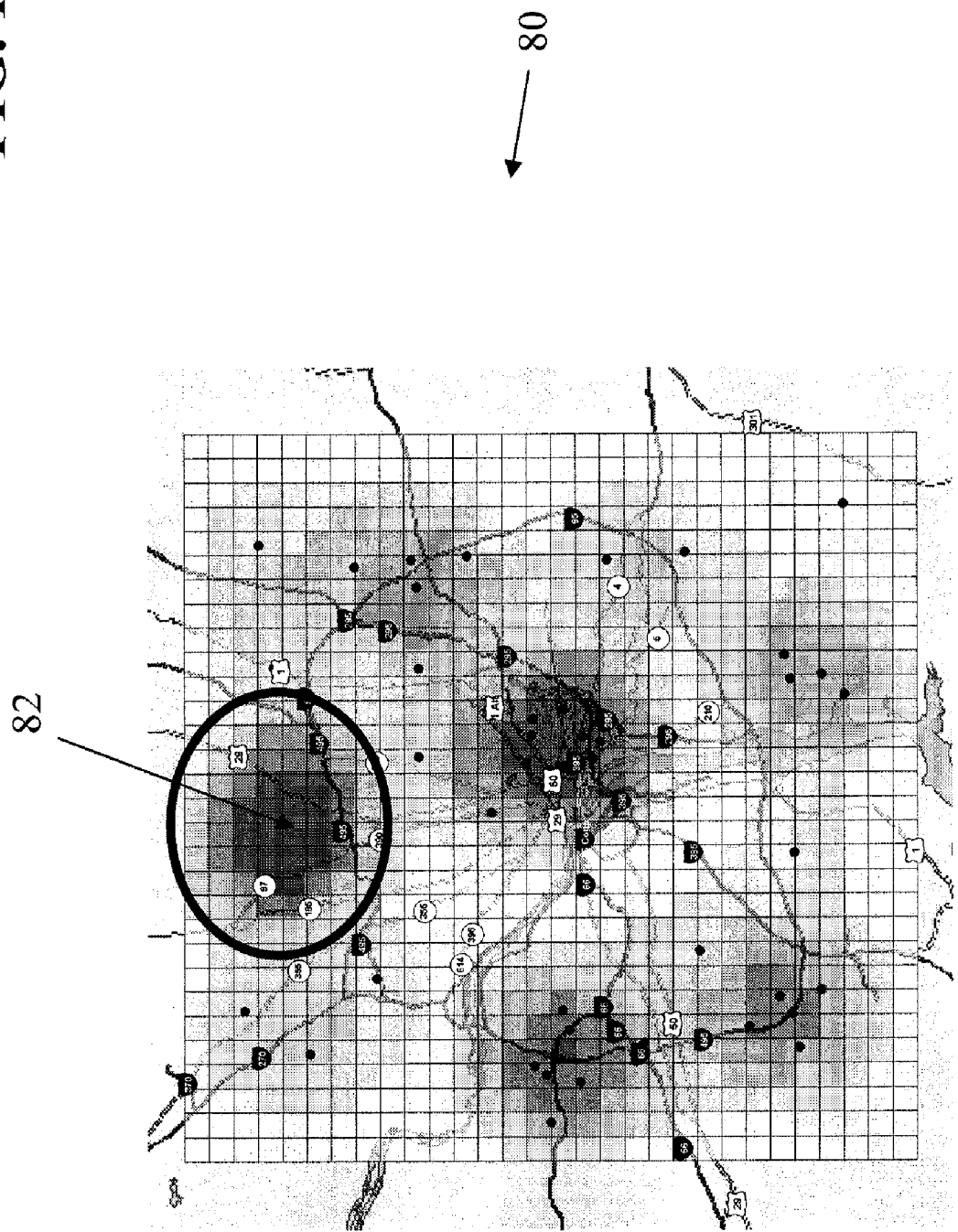
Figure 11:
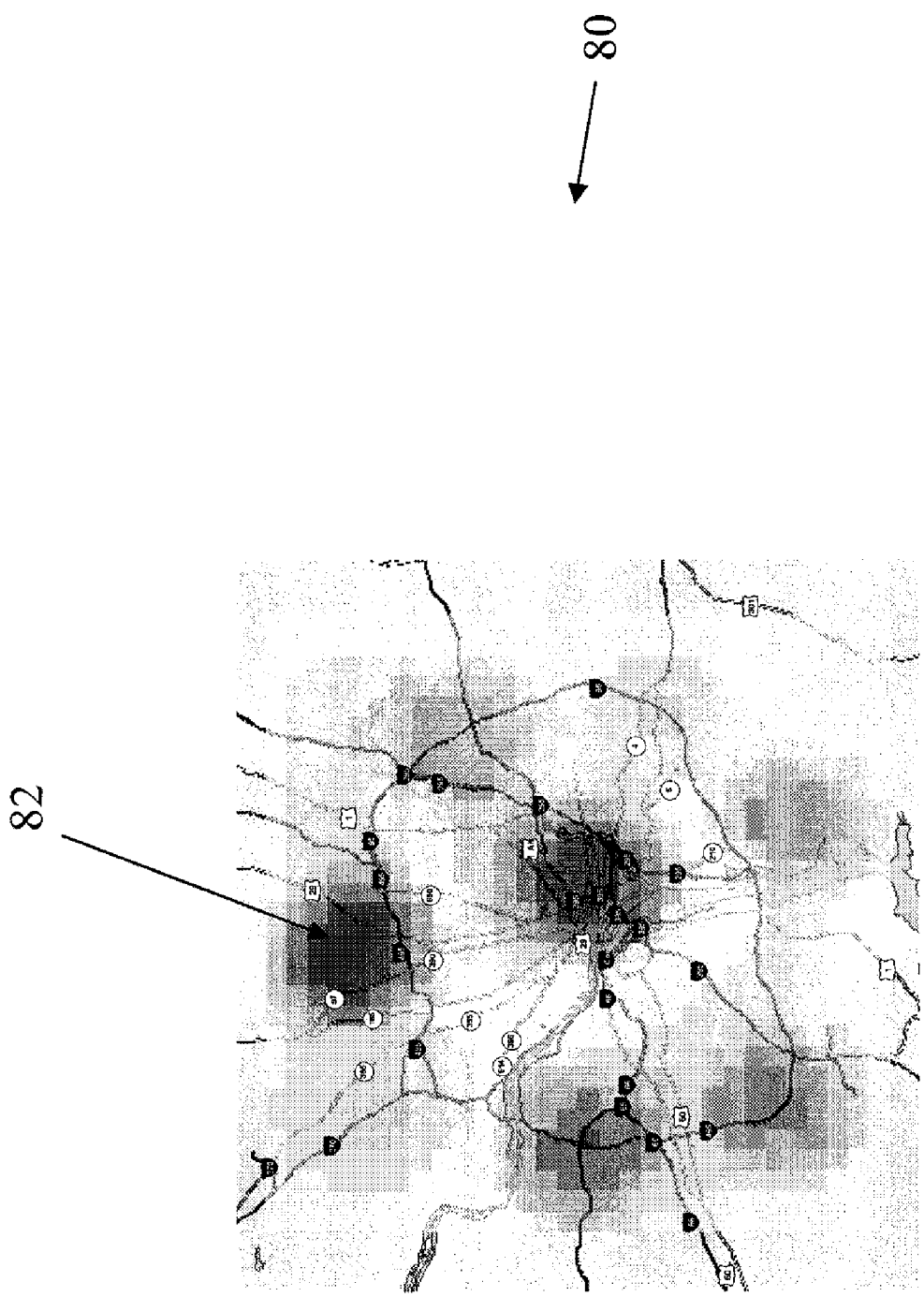

Once the cells have been given a score, the entire boundary 80 can be viewed at a distance to determine geospatial "hot spots" 82, as shown in FIGS. 8 through 11, and indicated at step 38 in FIG. 2. For instance, instead of limiting analysis to particular cells, the entire region can be analyzed for groups of cells that appear to have high probabilities of an event occurring. FIGS. 9 and 11 show the grid 80 without original cell lines, and FIG. 10 shows the cells slightly faded to reveal roads underneath.

In this way, the present invention helps evaluate where a future similar event might occur. Quite often, hotspots are revealed where no prior event has occurred. The system and method of the present invention can thus reveal that the environment in this hotspot is similar to the environment where prior events or results had occurred.

Figure 12:
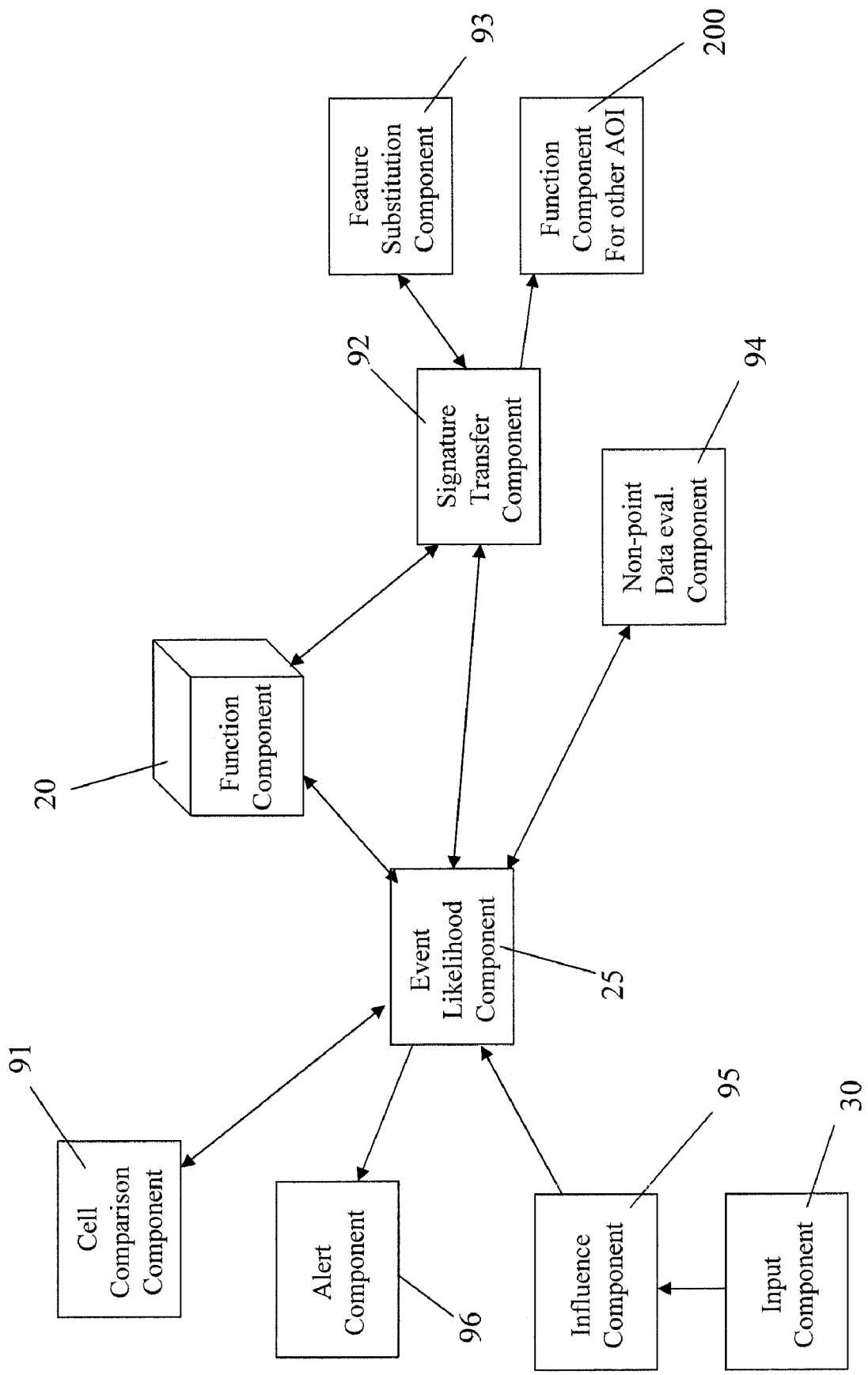
FIG. 12 is a schematic diagram showing an arrangement of components according to an alternative embodiment of the present invention.

As shown in FIG. 12, in one embodiment of the invention, the event likelihood component 25 interacts with additional components to assist in rapidly and efficiently reaching the most optimal assessment. For example, a cell comparison component 91 determines, for each past event in the training data, the individual cell element nearest to that event, and then associates the functional measurement for the nearest individual cell element with the data event. In doing so, the present invention need not determine a functional measurement for the event when it can be looked up by cell index, thereby improving the speed of the signature derivation. The cell comparison component 91 can then provide this information to the event likelihood component 25, which determines the level of signature match as described above.

As further shown in FIG. 12, the event likelihood component 25 can interact with a signature transfer component 92, which allows the system or a user to take event signatures (e.g., armed robbery signature) and apply it to a different area of interest as held or entered into the boundary component database 14. In this way, the invention contemplates that events which occur in a separate geographic region (e.g., bank robberies in Richmond, Va.) can be used to determine or predict similar events in another region. The signature transfer component can operate by taking the signatures and/or associated collections of probability functions for given event types in a first region, and applying them within the second region. This can occur via functional component 20 which accesses a separate set of data from boundary component database 14, or via a separate functional component 200 which has been pre-established for the second region.

As part of signature transfer component 92, the present invention contemplates that there may be variables of interest associated with a first region which have no direct equivalent in the second region. For example, "sidewalks" may be a variable of interest in the first region, but if there are no sidewalks in the second region, this variable could not ordinarily be taken into consideration in determining an event signature. In such cases, the present invention provides the signature transfer component with a feature substitution or variable equivalence component 93, which determines the next most likely substitute for the intended variable. For example, if there are no sidewalks in region 2, the feature substitution component may employ residential, secondary or tertiary roads as a substitute, given that such roads typically run parallel to sidewalks.

Further in connection with event likelihood component 25, a non-point data evaluation component 94 can be provided for situations where the past event training data is not conducive to representation in point format. For example, a location where an armed robbery occurs can be a point, such as the location of the bank where the robbery occurred. However, if the event type is broadened to encompass, for example, a radius of where an alleged perpetrator may have fled to within two minutes of the robbery, the past event data would not be represented as a point, but rather an area. The present invention can accommodate such past event data via the non-point data evaluation component 94. As such, this component 94 considers variations of non-point data such as, for example, polygons, lines, and three-dimensional data.

As further shown in FIG. 12, an influence component 95 can also be provided which assigns variable weights to variables of interest. In one embodiment of the present invention, the influence component 95 determines relative weights to associate with each of the variables of interest based on comparing the established signature for each variable of interest with a control signature. The control signature can be, for example, a random sample of data. In doing so, the present invention can detect the amount of overlap between the two signatures as a measure of the power of the given variable of interest in distinguishing the event locations from random locations.

The influence component can consider differences in variance between each of the established signatures and the control signature in determining relative weights. Further, the influence component can consider differences in mean between each of the established signatures and the control signature. It will be appreciated that while the present invention can distinguish between differences in variance as well as mean, a simple t-test or similar test does not do this.

Figure 19:
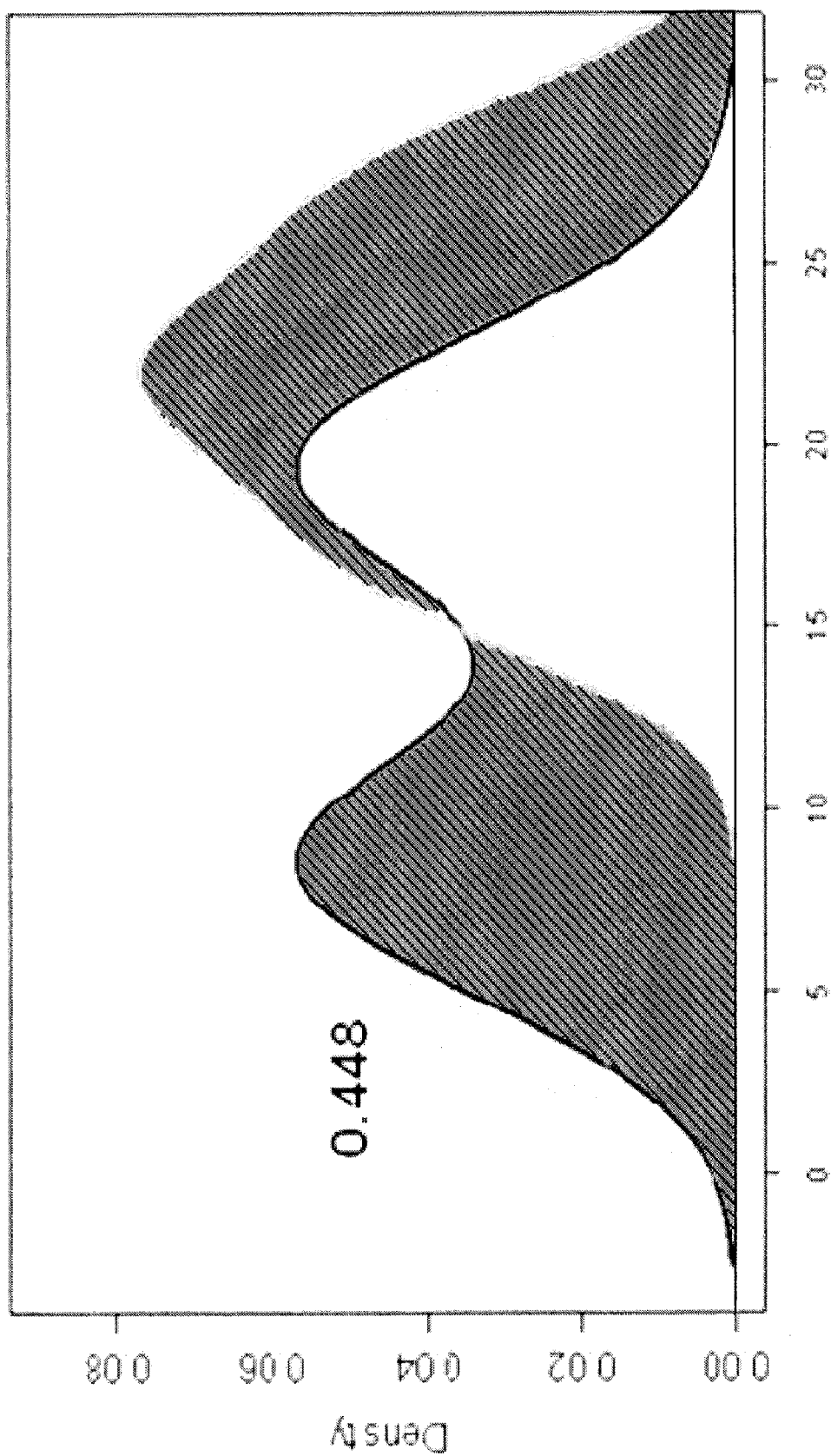
FIG. 19 is a depiction of a pair of probability density functions in partially overlapping relation in accordance with one aspect of the present invention.

The influence component can also consider differences in directionality between each of the established signatures and the control signature. As shown in FIG. 19, the directionality of the difference is determined by the directed divergence. This directionality determines whether events are closer or farther than expected statistically, which translates into the variable classifications. Once determined, the relative weights for each variable can be incorporated as variable coefficients in subsequent calculations by the function component, and in cases where a variable appears to have no determinative effect, the variable can be assigned a coefficient of zero.

As part of influence component, the present invention can determine a likelihood associating the event type's relative proximity to a modifiable variable of interest, i.e., a variable that can be modified in the real world (e.g., a traffic light that can have its timing adjusted, a roadside inspection point that can be moved, a parking lot entrance that can be closed). The influence component can also determine whether the modifiable variable of interest is capable of influencing the event type being studied (e.g., will changing parking entrances have any effect on vehicle break-ins?). Upon determining that the modifiable variable of interest is capable of influencing the event type, the present invention can influence (or provide at least one suggestion for) a real-world modification to the variable of interest. For example, the present invention can determine that certain criminal behaviors are exhibited near stop signs. The present invention can make a recommendation to install or move one or more stop signs to an area that may be monitored by law enforcement or to an area with fewer targets capable of harm. The real-world modification can be initiated by contacting relevant personnel by telephone or electronically through known communication means. The real-world modification can also be initiated by sending control signals to various physical machines and devices with instructions suitable for carrying out a physical action. For example, the influence component can signal a traffic system to initiate longer yellow (or amber) light periods, or the influence component can direct a fuel line transfer system to shut down. It will be appreciated that appropriate human oversight and approval structures (e.g., electronic approval) can be implemented in accordance with safety and other factors governing any application of this aspect of the present invention. Constraints may also be placed on the ability of the present invention to initiate real-world modifications. For example, a power system shut-down can be constrained by the need to power essential operating equipment. As another example, e-mail notifications to personnel may be constrained by time of day and day of week requirements. The real-world modification initiation can occur within the entire AOI or within only a portion of the AOI.

In considering the impact of specific factors in any assessment, the present invention can employ a tool and provide programming for factor metric analysis. Such analysis can be used to determine the "rank order" significance of factors, and how they contribute to assessment values. In one embodiment of the present invention, factor metric analysis can be applied in four different ways: (1) an overall metric analysis, by viewing metrics over the entire AOI grid, where the analysis tool reports the "average" factor contribution for the entire assessment area; (2) a regional metric analysis, by viewing metrics over a region of the AOI in which some threshold has been established (e.g., the top 10% of the assessment); (3) a point metric analysis, by viewing metrics at a specific cell; or (4) an event metric analysis, by viewing metrics at each of the grid cells where an event existed or occurred. A threshold would typically be applied in the overall or regional metric analysis in order to reduce computation and overburdening the system of the present invention.

Figure 26:
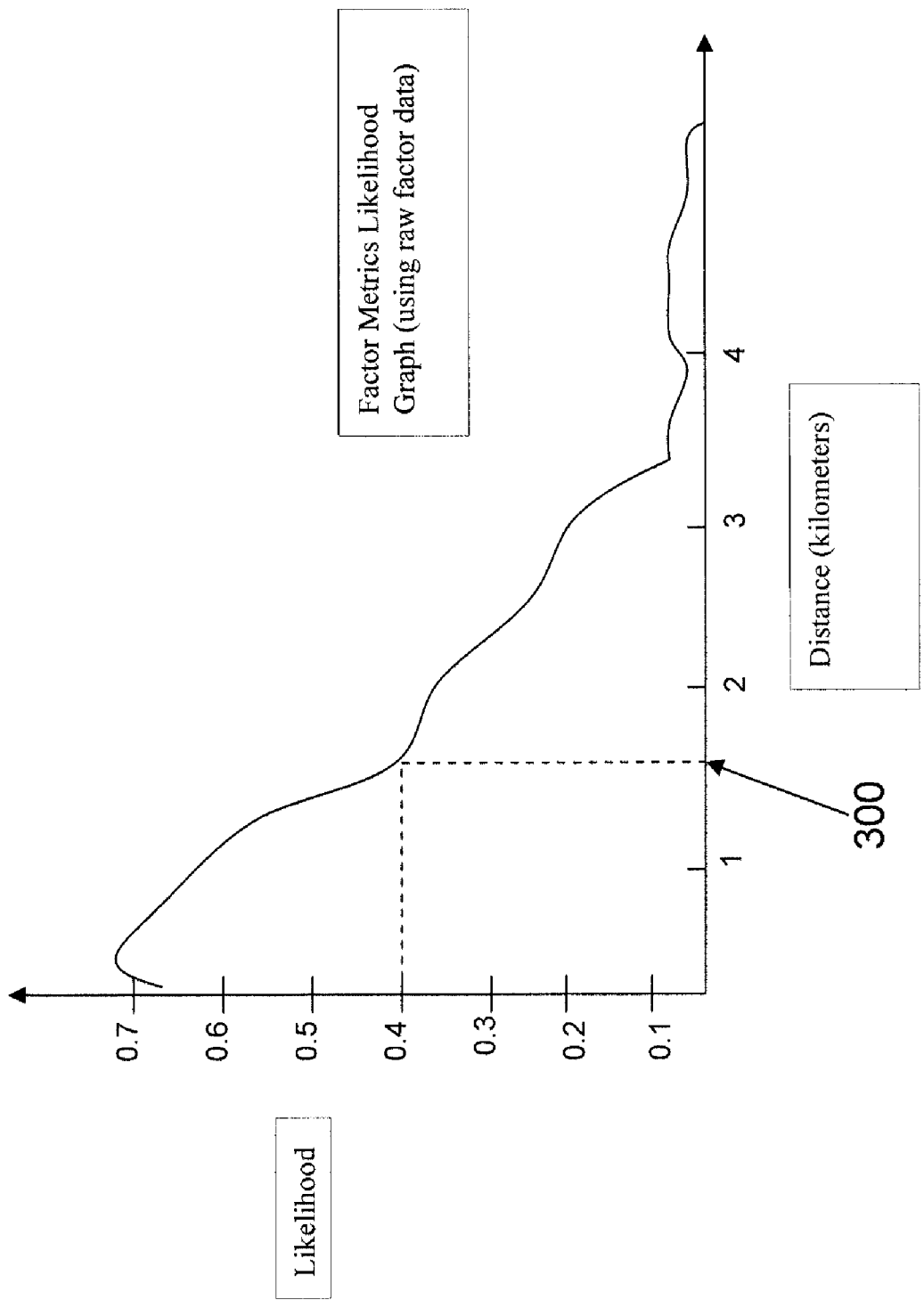
FIG. 26 is a sample graph illustrating an example probability distribution curve.

In one embodiment of the present invention, five factor metric are employed to characterize the relationship between factors and assessments that result from use of the present invention. First, the likelihood metric refers to the number corresponding to the raw factor data (RFD) value for a factor's event probability distribution curve. The likelihood value is independent of a factor's weight. For example, in FIG. 26, the RFD value 300 is assigned the likelihood of 40%. A second factor metric is weight, which can be applied to emphasize or de emphasize the importance of a factor as described above and in connection with FIG. 12, for example. Factor weights can be created on a case-by-case basis, or computed in batch by the present invention using a command that will integrate the assessed signature, for example. In one embodiment, each factor has a default weight of one (1.0), meaning it is of equal significance with all other factors. A third factor metric is weighted likelihood. This is the likelihood metric multiplied by the weight for a given factor. Thus, for example, if there is a 40% likelihood that the distance for a particular event is 1.8 kilometers from a highway intersection, and the highway intersection is a key determinant from past testing such that it is given a weight of 2.0, then the weighted likelihood is 80 percent (2.0 times 40%).

A fourth factor metric is contribution. Contribution is calculated by the present invention by subtracting the global minimum value of an assessment layer from the weighted likelihood value of a factor, which can effectively de-emphasize factors that do not have significant relative variance in the assessment layers. For example, given several factors contributing to a model, each cell will be comprised of the sum of the effects of each factor. The cumulative effects of a factor over all cells is the contribution of that factor. The contributions are normalized such that the sum of all factor contributions sum to one.

A fifth factor metric is contrast measure, which is the result of the integration of an assessed signature. This factor metric illustrates the difference between an environment probability density function (PDF) curve and an event PDF curve as in FIG. 19. The closer the value of this metric, is to 1.0, the more dissimilar the two PRFs are, while the closer the value of this metric is to 0.0, the more similar the PDFs are. Similar PDFs are interpreted to mean that the factor does not provide contrast with the background, and therefore does not provide predictive power to the model. The contrast measure can be used directly as a weight on the influence of each factor on the result, thereby deemphasizing unproductive factors.

In the embodiment of the invention wherein a number of layers are imposed upon the boundary, each of which is indicative of geospatial characteristics of at least one modifiable variable of interest, the likelihood determination step is applied to each of the modifiable variables of interest, and real-world modifications can be influenced (or suggested) on a plurality of the variables of interest. It will be appreciated that influencing a real-world modification to the variable of interest can be restricted by one or more constraints, as indicated above. It will further be appreciated that the influencing of a real-world modification to the variable of interest can be performed within only a portion of the AOI, as indicated above. In one embodiment of the present invention, computer simulations are used to determine whether the modifiable variable of interest is capable of influencing the event type. In another embodiment of the present invention, a relative weight can be assigned to the variable of interest based upon the step of determining whether the modifiable variable of interest is capable of influencing the event type.

In a further embodiment of the present invention, an objective function is derived and solved to determine one or more optimal modifications for the variable of interest so as to minimize or maximize the likelihood of the future event occurring in or away from the specified geospatial area. One option used by the present invention to solve the objective function is a naïve algorithm, including, for example, a Monte Carlo algorithm, as described in more detail below. Another option used by the present invention to solve the objective function is an evolutionary based algorithm, also described in more detail below.

It will be appreciated that the event being analyzed can be an activity, a behavior, a customer set, a threat. It will be appreciated that the variable of interest can be influenced at a given time. It will further be appreciated that artificially influencing the at least one variable can involve an informational event (e.g., newscast, video, message releases from high altitude, etc.). It will further be appreciated that artificially influencing the at least one variable can involve a physical process.

In one aspect of the present invention, the influence component can operate so as to selectively increase or decrease the likelihood of a future event occurring in a specified geospatial area. For instance, programming can be provided as outlined above for making probability assessments of a given event-type for a given geospatial area of interest (AOI) based on the geospatial characteristics of at least one variable of interest (VOI) and past geospatial data for the event-type.

The programming can further operate to determine whether the at least one VOI is modifiable and causal of the event-type. Upon determining that the at least one VOI is modifiable and causal of the event-type, the programming can iterate and modify a quantitative characteristic of the VOI until the desired likelihood of the event type is obtained.

The step of modifying a quantitative characteristic of the at least one VOI can include modifying a weight factor applied to the VOI. The step of modifying a quantitative characteristic of the at least one VOI can also include increasing or decreasing the number of instances of the VOI within the AOI. Further, the step of modifying a quantitative characteristic of the at least one VOI can be performed within pre-established constraints on the VOI.

It will be appreciated that the programming is capable of making a probability assessment based on the geospatial characteristics of a plurality of variables of interest (VOIs), and the step of iteratively executing the programming and modifying a quantitative characteristic can be applied to a plurality of VOIs that are modifiable and causal of the event-type.

Figure 27:
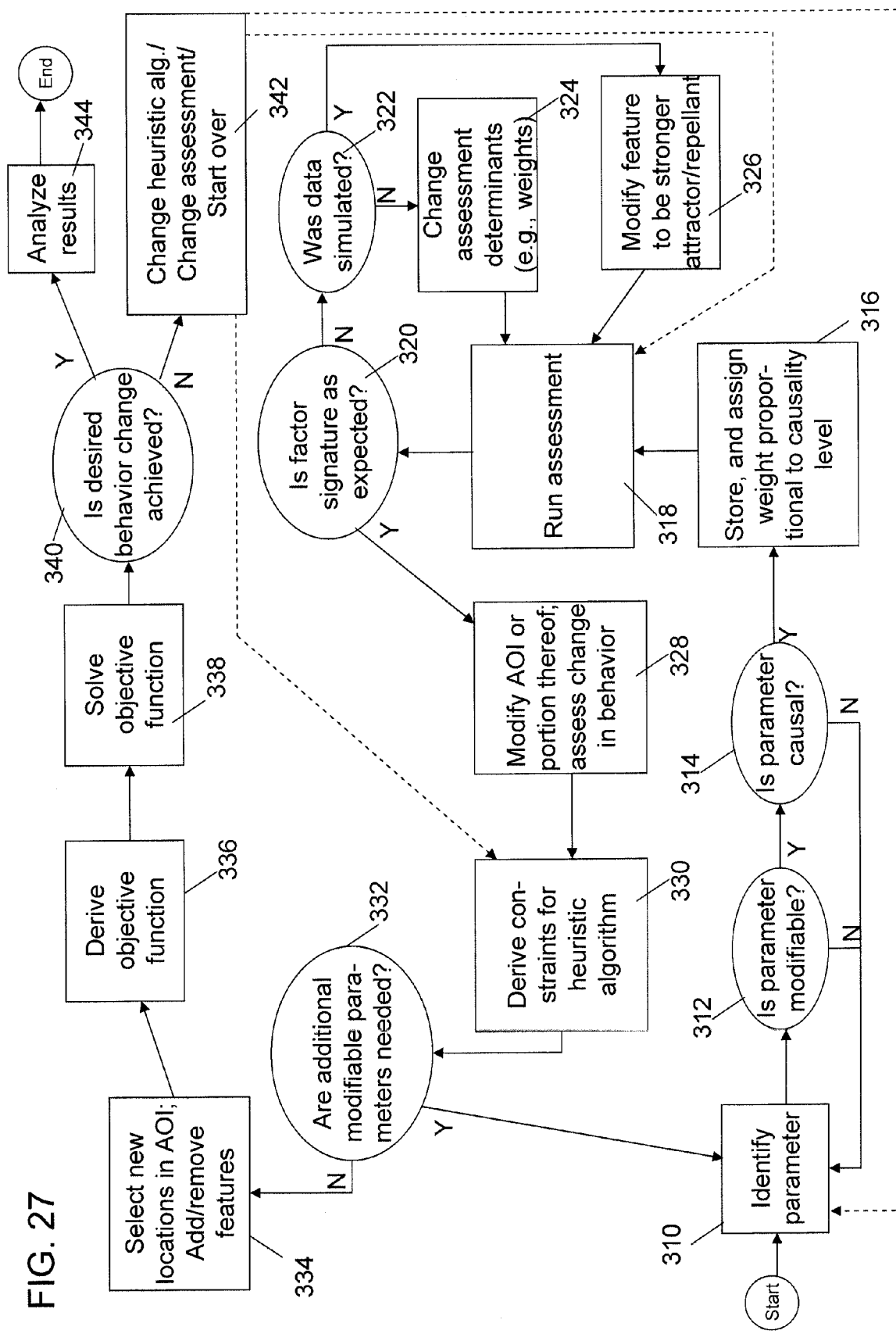
FIG. 27 is a flow chart illustrating a method in accordance with the spatial behavior modification aspects of the present invention.

In this way, the present invention can signify the importance of various modifiable features. Using such feature space modeling, the most important features or variables are identified as such. An example flow chart illustrating the process steps is shown in FIG. 27. As shown in FIG. 27, a given parameter is first identified as at 310. If the parameter is not modifiable as determined at 312, then another parameter is identified back at 310. If the parameter is modifiable (e.g., a roadside inspection point that can be moved), then a determination is made as at 314 as to whether the parameter is causal. For example, if it had been determined that there was some level of causality between roadside inspection points and bus bombings, then there would be a positive determination of causality for stop signs. If there is no causality, then another parameter is identified back at 310. If there is causality, even at some smaller level, then the parameter is stored as a causal parameter as at 316 and a weight can be assigned to the parameter based upon the determined level of causality, also at step 316. In one embodiment of the present invention, each relationship between a parameter or feature and an event/activity can be examined to determine whether the parameter/feature is an attractor for the event type or activity, a repellor, or a standoff (neither attractor or repellor, i.e., neutral). In a further embodiment of the present invention, pairs or other multiples of parameters/features are analyzed together to determine their joint characterization as an attractor, repellor or neutral element. In a further embodiment of the present invention, a contrast measure weight can also be applied as at step 316.

Further in FIG. 27, once the parameter is assigned a weight, an assessment can be run by the system of the present invention as at 318. If a factor is determined to be irrelevant at this stage, for example, it can be removed from the assessment for future assessment runs. If a weight is determined to be too high or too low, it can be adjusted and another assessment run. If the factor signature and/or PDF is not determined to be as expected (e.g., a strong attractor or repellor for the event type) as at 320, then a determination is made as at 322 as to whether data was simulated. If not, then an assessment determinant (e.g., parameter weight) can be changed as at 324 and the assessment re-run as at 318. If so, then the feature can be modified as at 326 to be a stronger or weaker attractor or repellor, and then the assessment can be re-run as at 318. As an example.

Once the factor signature is as expected after an assessment run, then the present invention can modify an area of interest (AOI) or a portion thereof to reveal the effect on the behavior being examined, as at 328. Using the bus bombing example, roadside inspection points can be removed and/or inserted on different streets, to reveal if this has an affect on the location, frequency, damage, casualties, etc., of bus bombings. Next, the present invention can be used to insert or develop constraints for a heuristic algorithm as at 330. For example, if roadside inspection points must occur at least twice in a five mile span of highway, must be alongside a road, separated by x distance units and limited in overall number, then the present invention can operate to constrain the analysis and possible solutions. If it is determined as at 332 that additional modifiable parameters are required in order to better influence the desired behavior, the present invention can return to step 310 for such additional review. If no new modifiable parameters are required, the present invention can optionally proceed to consider new locations within the AOI and determine which features to include as at 334. The present invention can operate so as to propose real-world modifications to features consistently throughout an entire AOI, or on a piecemeal basis. At step 336, the present invention is used to derive or to receive an objective function having a goal of minimizing or maximizing the risk and/or reward inside or outside of the AOI. The objective function can be used to find the optimal, heuristic solution for where and when to move/add/remove one or more features. At step 338, the present invention can use programming in the form of optimization software, for example, to solve the objective function and present solutions and/or recommendations for solutions, if the desired behavioral Change is achieved as at step 340, then the present invention can proceed to analyze the results as at 344 and end the process. If the desired behavioral change is not achieved, then at step 342 the present invention can optionally start over, make changes to the heuristic algorithm, and/or make changes to the assessment.

It will be appreciated that the present invention considers naïve-based and evolutionary based algorithms in solving the objective function. One example of a naïve-based algorithm is an exhaustive approach that divides an AOI into a certain number of possible feature locations, and iterates through all possible combinations of placing features in those locations to find the best result. Such an approach can become computationally expensive if more than just a few features are used, with the expected number of iterations being:

$$\frac{n!}{k(n-k)!} + n,$$

where n is the number of possible locations and k is the total number of features (e.g., checkpoints) that can be modified. As n becomes increasingly large, the equation approaches $n^k$. In this example, for one hundred locations and five features, there would be somewhere near ten billion iterations.

Another approach for a search algorithm used in one embodiment of the present invention is a Monte Carlo simulation. This algorithm takes a relatively large random sample from all possible combinations of features, and singles out the best solution(s). The algorithm ensures that each part of the AOI is sampled, and stops prematurely if a target critical value is found. The target critical value can be pre-determined according to user input.

In another embodiment of the present invention, an evolutionary algorithm is employed that will converge to a better solution over each iteration. For example, a genetic algorithm uses survival of the fittest principles in finding a suitable solution.

Assessments and analyses in connection with the behavior modification aspects of the present invention can result in an electronic or printed report outlining options for various real-world actions that might be taken to influence the desired or undesired behavior. Alternatively, a communication can be sent to decision makers or action takers indicating suggested actions and possible risks/costs/rewards associated with each. Further, an actual informational or physical event can be implemented as a result of the analysis. For example, a communication can be sent from the system via alert component 96, for example, to a news organization, an Internet blog, or any other type of media to disseminate a message designed to influence real world behavior. If, for instance, it is determined that more frequent suicide bombings occur when a foreign dignitary is arriving in town, then a message (possibly false, depending on the circumstances) can be sent out to alert those who might act on such information that a foreign dignitary will be arriving. Additionally, a physical embodiment of a real-world action can be initiated. For example, a traffic light may be caused to turn from green to yellow to red more frequently if it is determined that car bombers are more likely to strike when a traffic light has a longer red light period. There are vast examples of different informational and physical actions that can result from the analysis performed according to the present invention.

In a further aspect of the present invention, change detection for generated signatures is employed. Change detection is important so that the system keeps data and analyses fresh and current in order to best inform related decisions. As an example, if the system of the present invention assesses locations of boating accidents and determines that they are much more likely to occur in shallow water near major metropolitan cities as opposed to on the open water of a bay, lake or ocean, then the developed boating incident signature would reflect such analysis. Using the present invention, the boating incident signature can be periodically reviewed to assess whether there are any changes to the signature over time. For example, a reassessed signature might determine that the boating accidents have changed in their predictability from location only, to additional factors such as temperature change and day of week (e.g., accidents occur more frequently on Saturdays and on days where the temperature is 10 degrees or more warmer than the previous day).

In one embodiment of the present invention, change detection occurs on the fly as each new event used in an assessment is applied. For example, a threshold change factor (e.g., 10%) for a change statistic (e.g., the average distance from the event to all previous events) can be pre-defined so that if the new event exceeds that threshold, a signature change is acknowledged, reported and recorded. The change statistic is thus calculated to determine whether the pre-determined threshold has been met or exceeded. In one embodiment of the present invention, the change statistic calculates the similarity of the known new event to all previous events of the given event type. This method can be called the average link clustering method on the feature space vector model of the present invention.

In one embodiment of this aspect of the present invention, the signature derivation component establishes and stores an original geospatial signature for a given event type based on a determined likelihood associating the event type's relative proximity to a variable of interest (VOI) within a geospatial area of interest (AOI). An interface receives geospatial information pertaining to one or more subsequent events of the given event type within the AOI, including location information for the one or more subsequent events. Then, the event likelihood determinant component classifies the received information as part of the original signature or as an outlier, and, upon the received information meeting or exceeding a pre-determined threshold for classification as an outlier, the event likelihood determinant component establishes and stores a reassessed signature for the given event type.

In another embodiment of this aspect of the present invention, changes in techniques, tactics or procedures associated with an event are detected. The signature derivation component establishes and stores an original geospatial signature for a given event type based on a determined likelihood associating the event type's relative proximity to a variable of interest within a geospatial area of interest (AOI), wherein the original signature can be depicted as a technique, tactic, procedure or combination thereof (e.g., bombing of fuel tanks in a war environment, channeling traffic using toll lanes, pass attempts over forty yards in a football game). The interface then receives geospatial information pertaining to one or more subsequent events of the given event type within the AOI, including location information for the one or more subsequent events. The event likelihood determinant component then establishes and stores a reassessed signature for the given event type based on the received geospatial information, compares the reassessed signature to the original signature and depicts changes in the reassessed signature as a change in technique, tactic, procedure or a combination thereof.

In one embodiment of the present invention, event types can have sub-indicators. Thus, for example, if suicide bombings are an event-type, there may be a sub-indicator for a Party1-type suicide bombing, another sub-indicator for a Party2-type suicide bombing and a third sub-indicator for a Party3-type suicide bombing. An original geospatial signature is stored for each sub-indicator and newly received information is classified as pertaining to one of the plurality of sub-indicators.

In another embodiment of the present invention, a nonparametric extension of a two tailed t-test can be employed for change detection. Classical statistics provides a two-tailed t-test for accepting or rejecting the null hypothesis that an observation is significantly different from the mean (e.g., higher or lower). One can interpret this test as a statistical basis for determining whether the data value was produced by the same (or similar) distribution. This test is extended in this embodiment of the present invention to the nonparametric case in which the underlying distribution is empirically derived, and not necessarily symmetric. An empirical PDF can be constructed by the feature space model described herein, resulting in an event-based PDF for each factor/feature. For each new event, the distribution of the previous events with respect to each of the geospatial factors in the AOI is empirically approximated. For each factor, the area for which the likelihood is less than or equal to the likelihood at the new event is calculated, and the product of such measures is used as the change detection statistic. Should the change detection statistic exceed a known or pre-established threshold, the present invention can conclude that the event did not come from the distribution and therefore that a significant change has been detected.

Changes in a variety of factors can be detected, including buyer behavior, criminal behavior, and war behavior (e.g., techniques, tactics and procedures (TTP)), for example, using the change detection methods of the present invention. Once the present invention analyzes a set of data or event-type signature for change detection, it can classify the new data as being an outlier (meaning that a signature shift has occurred), a mixture (meaning there may now be two signatures for the event-type), or an isolated outlier (meaning not enough outlier events have been received in order to categorize it as a signature shift, in which case the original signature is kept and no signature shift results). With regard to the mixture classification, the present invention can operate such that received information pertaining to new events (e.g., event-type signature) arrives at or passes a threshold for indicating that there is no signature shift, but does not arrive at or pass a threshold for indicating that a full signature change exists. In such a case, two signatures can be stored for the given event-type.

As further shown in FIG. 12, an alert component 96 can also be provided which incorporates assessments from the event likelihood component 25 in order to determine and notify individuals or units in the field of operation (area of interest) about potential hot spots. Such a notification may include a notice to evacuate the area, or a notice to take certain action in or around the area. In connection with influence component, the alert component can notify field units to move, remove, or insert specific features within an AGE. For example, the field unit can be notified that certain roadside inspection points need to be moved in order to influence behavior according to the methods described above. Alternatively, the present invention may detect a signature change in certain business, criminal or war behavior, and alert a field team to be prepared to take action (e.g., move location, watch for activity, don gas masks, etc.).

Figure 13A:
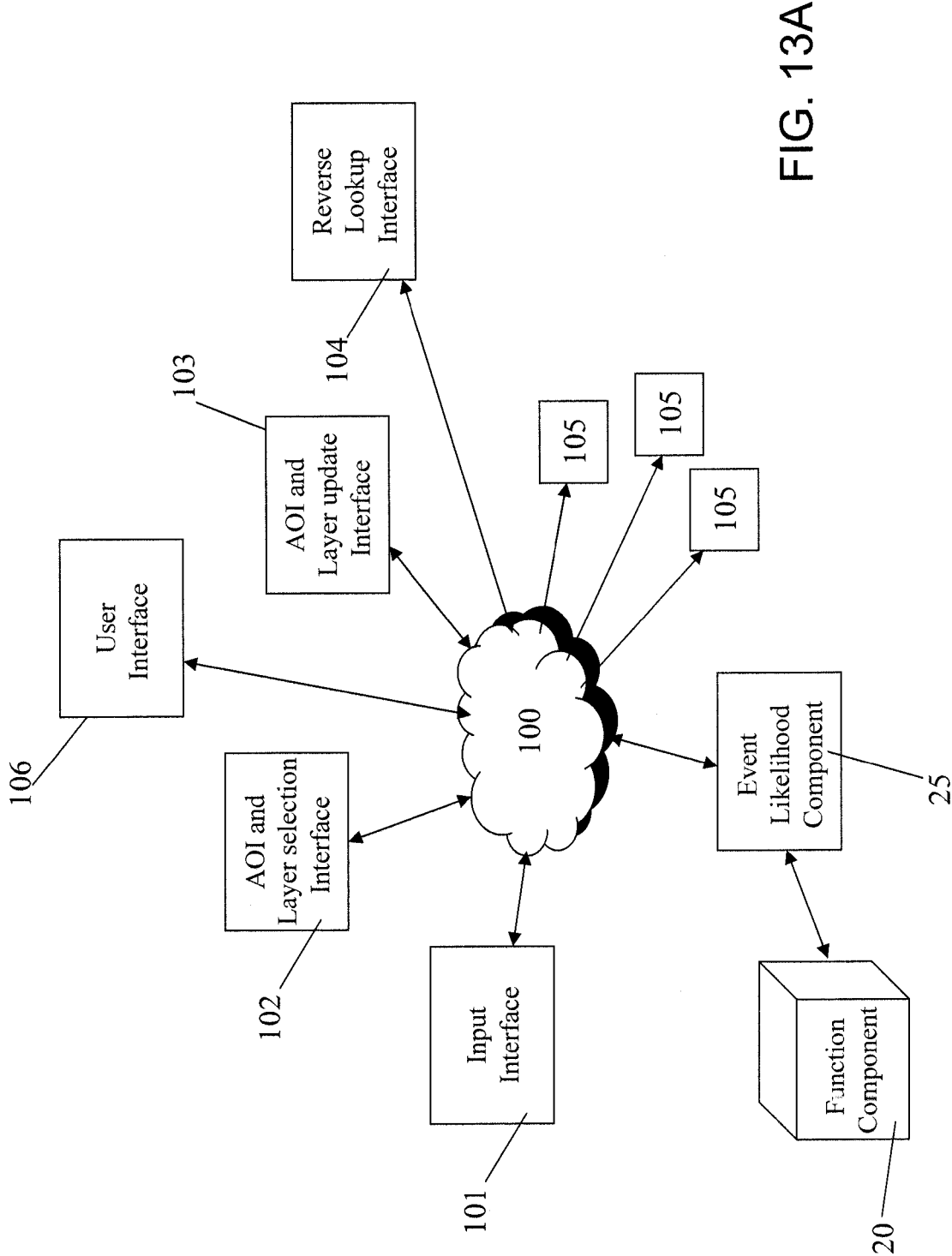
FIG. 13A is a schematic diagram showing additional components interacting with the event likelihood component according to various embodiments of the present invention.
Figure 13B:
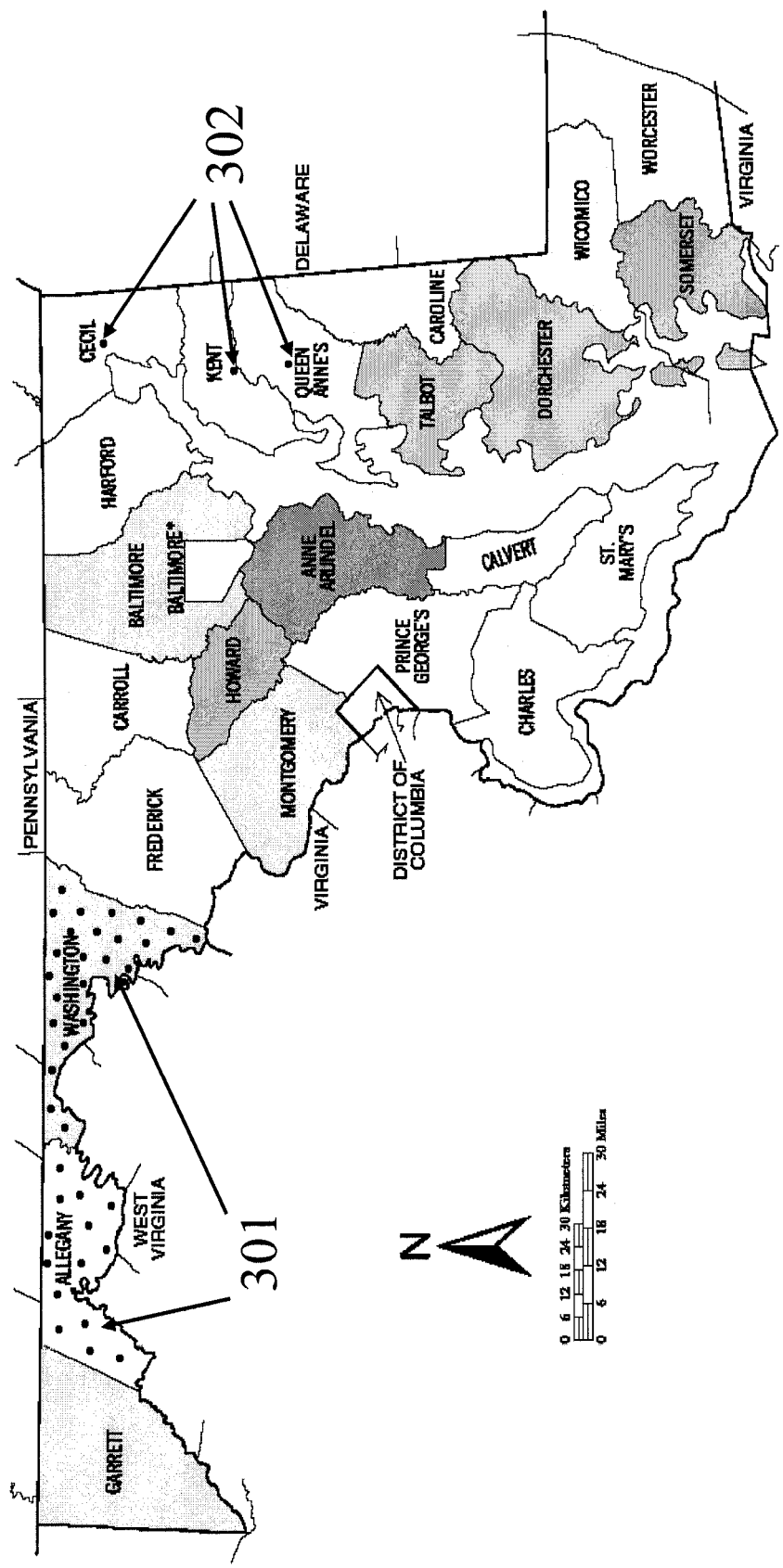

As shown in FIG. 13A, in one embodiment of the invention, the event likelihood component 25 is accessible via a network 100 such as the Internet through one or more user input components 101-106. For example, input component 101 can provide a user interface for entering the training data used by the event likelihood component in generating assessments. Layer selection component 102 can be provided with a user interface to allow a user to select which layers and relevant variables of interest the user wishes to employ in the analysis. Different layers of the same variable might be selected based on time frame, for example. Alternatively, different variables might be selected within the same layer. Factors and groups of factors can be enabled and disabled at the user's option. A user might also choose to assign weights to the variables manually, or designate the integration of the influence component of FIG. 12. Area of interest and/or layer update component 103 can be provided to input new or updated areas of interest and/or layers into the system. Reverse lookup component 104 can be provided with a user interface to allow a user to enter information pertaining to an unknown event type, so as to have the system of the invention determine which event type most closely matches the signature corresponding to the input data. The reverse lookup component determines the type of event associated with the event data by determining an event data signature, comparing the event data signature with known signatures, and determining what the most likely event is. Alert units 105 can also be provided in communication with network 100 to receive alert notifications as described in connection with FIG. 12.

Figure 20:
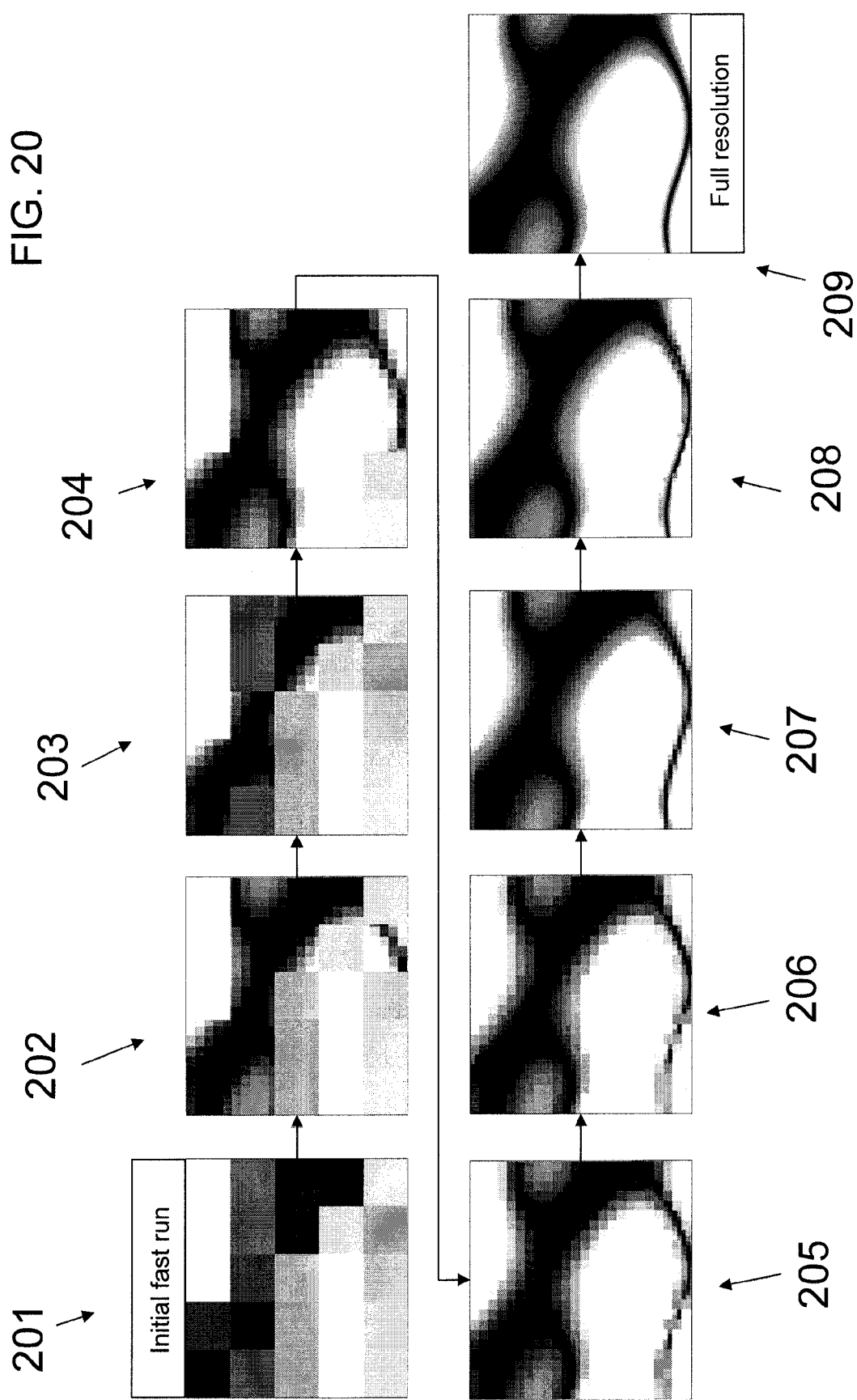
FIG. 20 shows a series of images of varying resolution in accordance with a further aspect of the present invention.

As shown in FIG. 20, for time sensitive assessments, the invention can produce a low resolution product (e.g., 201) and then use the information from that assessment to triage the remaining processing to complete the highest resolution image (e.g., 209). This can occur over multiple stages of refinement as a background process (e.g., 202-208). As a user requests a result, they receive the most updated assessment if the final assessment has not been completed.

While not shown, a result likelihood component can be provided in lieu of or in addition to the event likelihood component, with the difference being that the result likelihood component is concerned with past results, and not necessarily past events. For example, the result likelihood component can collect result information, such as the location of the top performing retail store in a retail chain, and use the system of the present invention to determine a likelihood of a similar result occurring in a different location.

In one embodiment, the invention can also provide information as to why an event was predicted for a given geospatial area. For example, if a given cell appears to have the highest score, designating the closest signature match, one can drill down into the details of why a given cell or region has the highest score. For example, a user might employ a graphical user interface to select a segment of the display. The invention will then reveal a list of all features used in the assessment sorted according to their contribution to the grid element selected. The top ten features are then reported to the user.

In a further embodiment, the invention also contemplates that a given map may have "hot" and "cold" cells that vary depending on time of day, time/day of week, time/day of month, or time/day/season of year. It will be appreciated that the invention can use flat maps and maps adjusted for the earth's curvature. It will also be appreciated that the invention allows portability of analysis, as preprocessed data and event information can be stored in a binary file and used in laptops, PDAs, cell phones or other mobile computing devices in the field.

It will be appreciated that various problems presented by governments, private companies and individuals require specific novel solutions for use with the present invention. For example, a company involved in landscaping may desire a list of targeted prospects. Such a company would not be interested in townhomes having no land for trees, shrubs, flowers and the like. Thus, such a company would use the present invention with certain static variables of interest programmed in, such as land utilization (e.g., homes with yards, new building construction areas) and other similar variables. A general portal access component 106, as shown in FIG. 13A, can provide an interface for a user who may enter general problem specifications, allowing the event likelihood component 25 to determine which area of interest, layers, variables, weighting and other factors to incorporate in providing an assessment.

Another company type, such as a retail establishment, would likely be more concerned with past successful results of other similar establishments (whether its own establishments or those of others) and not necessarily past events. Such an approach using the present invention might assess locations of existing establishments having gross revenues in excess of a target number, and the invention might determine proximity of such establishments to major and minor roads, stoplights, other complementary retailers (e.g., a shoe store near a dress shop, or an ice cream store near a strip mall), etc. With such information, the invention would then determine a probability density function or other appropriate function (e.g., a signature) and compare cells of a geographic grid to determine the location with the highest likelihood of reproducing the results of the pre-existing retail establishments. In such an embodiment, the present invention could map the results from a first geographic grid to a second grid, such as a developing community, for example.

For law enforcement and similar applications, users of the present invention might be more interested with events than results. Also, in such applications, users might desire to employ specific delivery mechanisms (e.g., binary files delivered by wireless communication) for real-time information collection and dissemination. In such applications, the present invention might also use more dynamic variables, such as vehicle density during given hours of given days of the week. Such information might be helpful in determining potential get-away routes for would-be criminals, for example.

The present invention can adapt to real-time communication of events in presenting geospatial analysis and event prediction. For example, the present invention may provide different "hot spot" analysis for a series of events that occur every few days, as opposed to a batch of events that occurred weeks earlier, followed by another batch of events occurring in current time. In the latter scenario, greater weight can be placed on the "live" events in predicting where the next similar event might occur.

In one embodiment of the present invention, input events can be weighted in any manner desired. In this way, as an example, if more recent events are believed to have a higher forecasting impact on future similar events, recent events can be weighted more times for the resulting assessment. Other factors, such as the lethality of an attack, or actual revenues, for example, can be considered as factors or events which receive greater weight. It will be appreciated that placing greater weight on a given input event would not require the present invention to make the same function call and/or determination multiple times. Rather, the function call could be made once, and then the results weighted numerically in order to reduce the memory and computational drag on the system.

In one embodiment of the invention, a web-based portal can be provided to allow users to define a problem for which geospatial modeling is desired. The business features (e.g., payment, contractual, privacy), programming and connectivity features (e.g., Internet programming available by high or low-speed connection through web and application servers), and security features (e.g., firewall, SSL) of such an arrangement will be appreciated as well-known in the art.

In a further aspect of the present invention, temporal factors are considered in great detail. Database 14 can be adapted to include temporal data and indexes or indices into the temporal data (in addition to the spatial data and associated spatial data indexes or indices), with search and retrieve capabilities. The search and retrieve functions can be employed via programming that accepts requests for geospatially or temporally-referenced data, accesses the geospatial or temporal data from a medium upon which the geospatial or temporal data are stored and provides responses to the requests. Depending upon a request received from a user, the programming associated with the geospatial and temporal databases can determine whether to access the geospatial database or the temporal database.

As an example, one index for the geospatial data can be stoplights. A search query that involves stoplights and uses the stoplight index term can thus rule out non-stoplight terms to provide a focused data return. One index for the temporal database can be specific years, such as 2002, for example. A search query that involves the year 2002 and invokes the 2002 index can thus rule out non-2002 years.

If, for example, one were studying the effect of putting traffic enforcement cameras at traffic light locations (i.e., stoplight locations) over a period of years, one could query the database of the present invention for data indicating where enforcement cameras were placed at different time periods. For example, a query can be run for each individual year from 2000 to the present for a single jurisdiction or a plurality of geographic locations. The response to such a query can be a listing of traffic enforcement camera locations, or a map detailing locations of such camera locations, or a combination of the two.

In a further embodiment of the present invention, events (as opposed to time, place or other temporal or geospatial data) and event-types are stored having event-type data, temporal data and geospatial data, the present invention might store "automobile accidents" as event-type data, and further sub-categorize the data according to date, time and location of the accident. In this way, the user can query the following, for example: "automobile accidents, occurring during the daytime since 2000 at traffic enforcement camera locations within the greater Boston area." The automobile accidents would be the event-type data, the times would be daytime since 2000 and the geospatial data would be Boston traffic enforcement camera locations. In one embodiment of the present invention, a user interface in accordance with the present invention can respond to such queries with clarification questions, menus or other interface options designed to elicit a response from the user to better enable the search. For example, in the above, the present invention can ask the user if a yearly comparison of 2000, 2001, 2002, etc., is desirable. Further, the present invention can ask the user if it should use daylight approximations based on stored data pertaining to when it would have been daylight over such time periods (e.g., weather data storage facilities either provided as part of the database of the present invention or as externally accessible, e.g., over the Internet can be accessed to incorporate the fact that days in the summertime are longer than days in the winter time, down to the specific minute according to sunrise and sunset data). The results of such a query can be a report, a map display (e.g., color-coded or otherwise differentiated to show differences based on the yearly request).

In one embodiment of the database aspect of the present invention, records can be stored according to a tree-type structure with the actual records in locations called leaves. Leaves are end points with nothing beyond them, and are accessed by going through nodes, which are points along the way. The starting point can be called the root and the number of access operations required to reach the desired record is called the depth. As can be imagined, a tree-structured database in accordance with the present invention can have thousands, millions, or billions of nodes, leaves, and records. In one embodiment of the present invention, searching algorithms such as a splay tree can be provided to minimize number of access operations required to recover desired data records over a period of time. In such an embodiment, the tree organization varies depending on which nodes are most frequently accessed. In the splay tree embodiment, the structural change rotating or interchanging the root with the node in question. One or more other nodes might change position as well. In this way, both queries and data additions can be managed more efficiently.

Figure 28A:
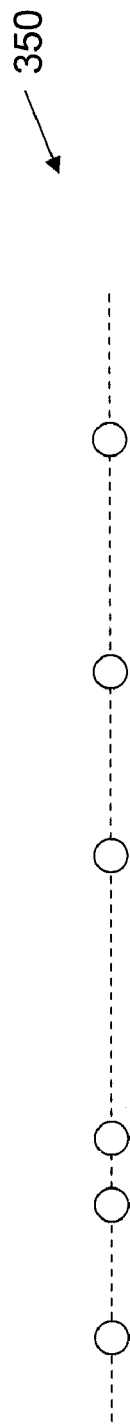
FIGS. 28a through 28e are sample diagrams illustrating temporal data indexes that may be used in accordance with one aspect of the present invention.
Figure 28B:
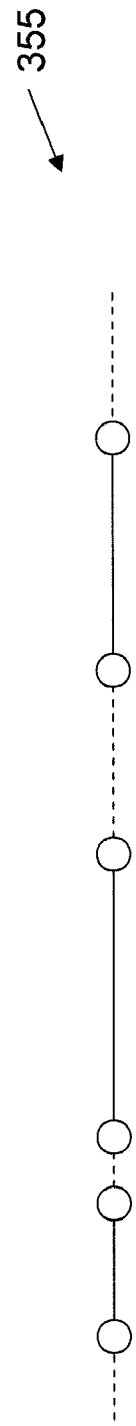
Figure 28C:
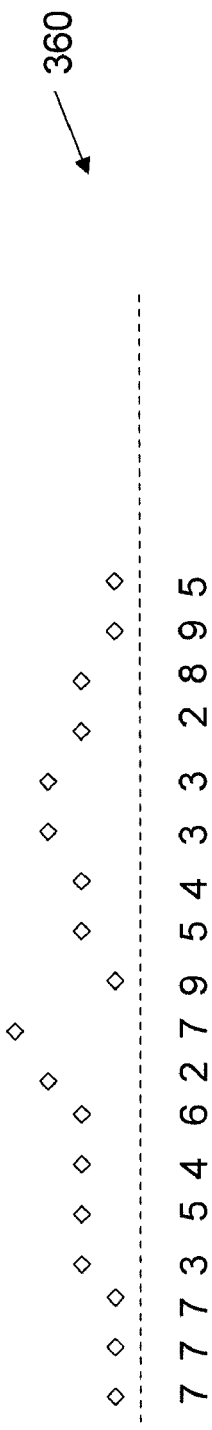
Figure 28D:
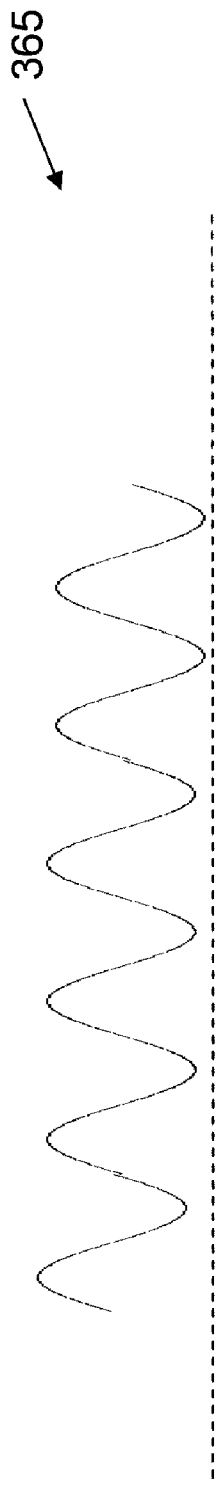
Figure 28E:
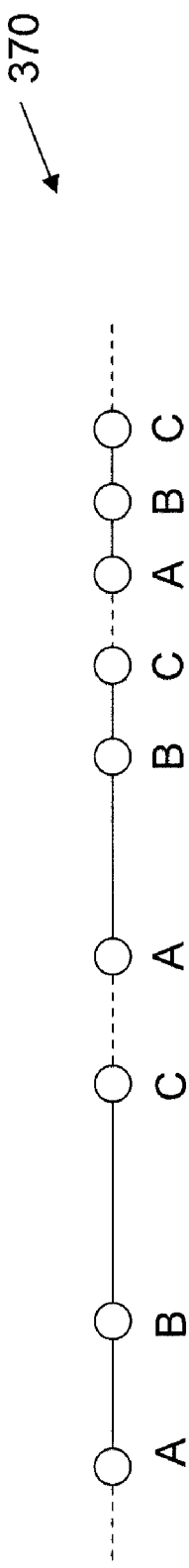

In one embodiment of the present invention, the temporal database includes at least one index based upon trends, at least one index based upon seasons, at least one index based upon cycles, at least one index based upon series, at least one index based upon points in time (i.e., instants), at least one index based upon sequences and at least one index based upon intervals. Instants are described by a list of data points with a date/time stamp, optionally including attributes, as shown at 350 in FIG. 28a, for example. Intervals are described as a list of events which have start and end date/time stamps, optionally including attributes, as shown at 355 in FIG. 28b, for example. Series are described by a series of data values associated with an aggregate time interval (e.g., day, week, month, etc.), as shown at 360 in FIG. 28c, for example. Cycles can be a sinusoidal function described by a frequency and amplitude as a function of time, as shown at 365 in FIG. 28d, for example. Seasons can be periods of a year, e.g., winter, spring, summer, and fall, or can be selling seasons, for example. Sequences, can be described by an n-step irregular list of date/time stamps, as illustrated at 370 in FIG. 28e, for example.

Metadata associated with and stored in temporal database can include identification information (e.g., creator, description, date/time created, status, date range of relevance, keywords (e.g., theme, place), use constraints, etc.), data type information (e.g., instant, interval, series, cycle, sequence, season), recurrence information (e.g., a data set can have recurrence parameters that describe a repeating pattern (e.g., daily, first Sunday of each month, quarterly, etc.)), quality (accuracy and completeness), temporal reference information (e.g., reference system definition, calendar system (such as name (e.g., Julian calendar), parameters (e.g., time zone, daylight savings time))), and attribute data dictionary information, for example.

Various operations can be supported using the temporal database incorporated as one aspect of the present invention. For example, instant data can be converted to cycle, interval, sequence and/or series data through analysis. Time series information can be analyzed for an internal structure, such as a trend, seasonality or autocorrelation, for example. Data can be plotted to show summary information of temporal data and analysis, including through a cycle summary chart, a time series plot, and a calendar plot, for example. In the calendar plot, different areas may be shaded (e.g., Sundays, the month of February) to indicate heavier occurrences of events being analyzed, for example.

In addition to the above, using the temporal database, the present invention can detect changes in event timing, and can further model the likelihood of a future event occurring at or around a given time in a specified geospatial area. With regard to detecting changes in event timing, the present invention can first establish and store an original temporal signature for a given event type based on a determined likelihood associating the event type's relative proximity and time of occurrence to a variable of interest (VOI) within a geospatial area of interest (AOI). For example, if bank robberies tend to occur at the opening of business (e.g., 9 a.m.) in remote bank branches, an original temporal signature can depict this. Next, the present invention receives temporal information pertaining to one or more subsequent events of the given event type within the AOI, including timing information for the one or more subsequent events. Thus, for example, two new attempted bank robberies may have occurred at 9:00 a.m. and 4:30 p.m. Next, the present invention classifies the received information as part of the original signature or as an outlier, and upon classifying a threshold portion of the received information as an outlier, the present invention can establish and store a reassessed signature for the given event type.

With regard to modeling the likelihood of a future event occurring at or near a given time in a specified geospatial area, the present invention provides programming capable of making probability assessments of a given event-type for a given geospatial area of interest (AOI) based on the geospatial characteristics of at least one variable of interest (VOI) and past geospatial and temporal data for the event-type, as described above. Next, the present invention determines, using influence component, for example, whether the at least one VOI is modifiable and causal of the event-type within a pre-established time range. Then, upon determining that the at least one VOI is modifiable and causal of the event-type within a pre-established time range, the present invention iteratively executes the programming while modifying a quantitative characteristic of the VOI until the desired likelihood of the event type is obtained.

It will be appreciated that the present invention can incorporate a temporal data operating standard or format that includes a cyclic redundancy check value for detecting data corruption. The present invention can further incorporate a chron file format with supporting software library for conversion of data, input/output and metadata.

The geospatial modeling method and system of the present invention has an extensive array of applications. Service and product-based businesses can learn where to target market, to whom to market, where to locate an establishment, what markets to expand into, what variables are more reliable predictors of success, and so forth.

EXAMPLE 1

The following example is provided as an illustrative case of the operation of the present invention.

User A is a metropolitan crime analyst who develops planning maps for the tasking of law enforcement units. Due to a recent increase in breaking and entering offenses, User A desires to create a summary map that will describe the likelihood of a breaking and entering event occurring throughout her city.

Figure 14:
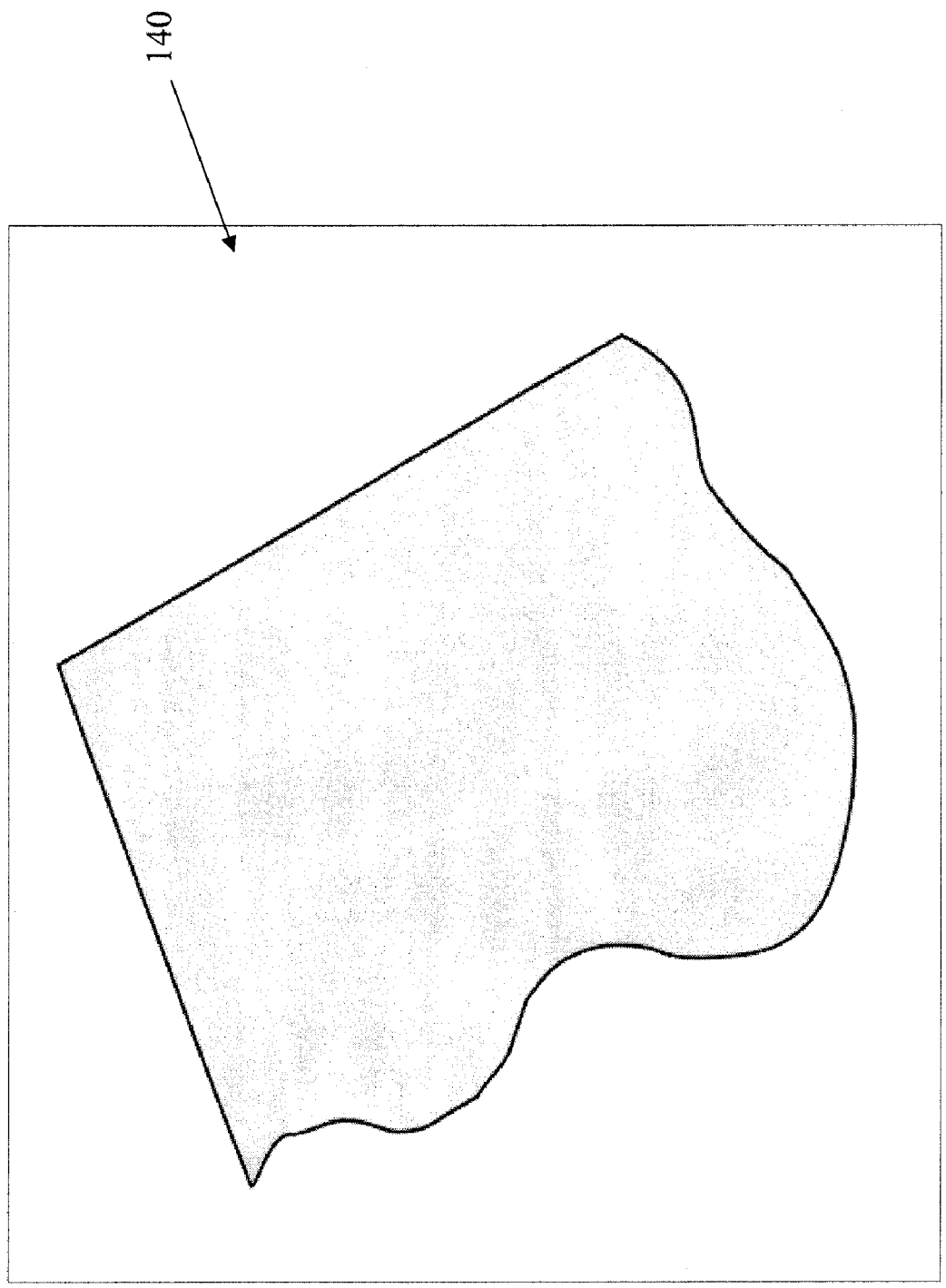
Figure 15:
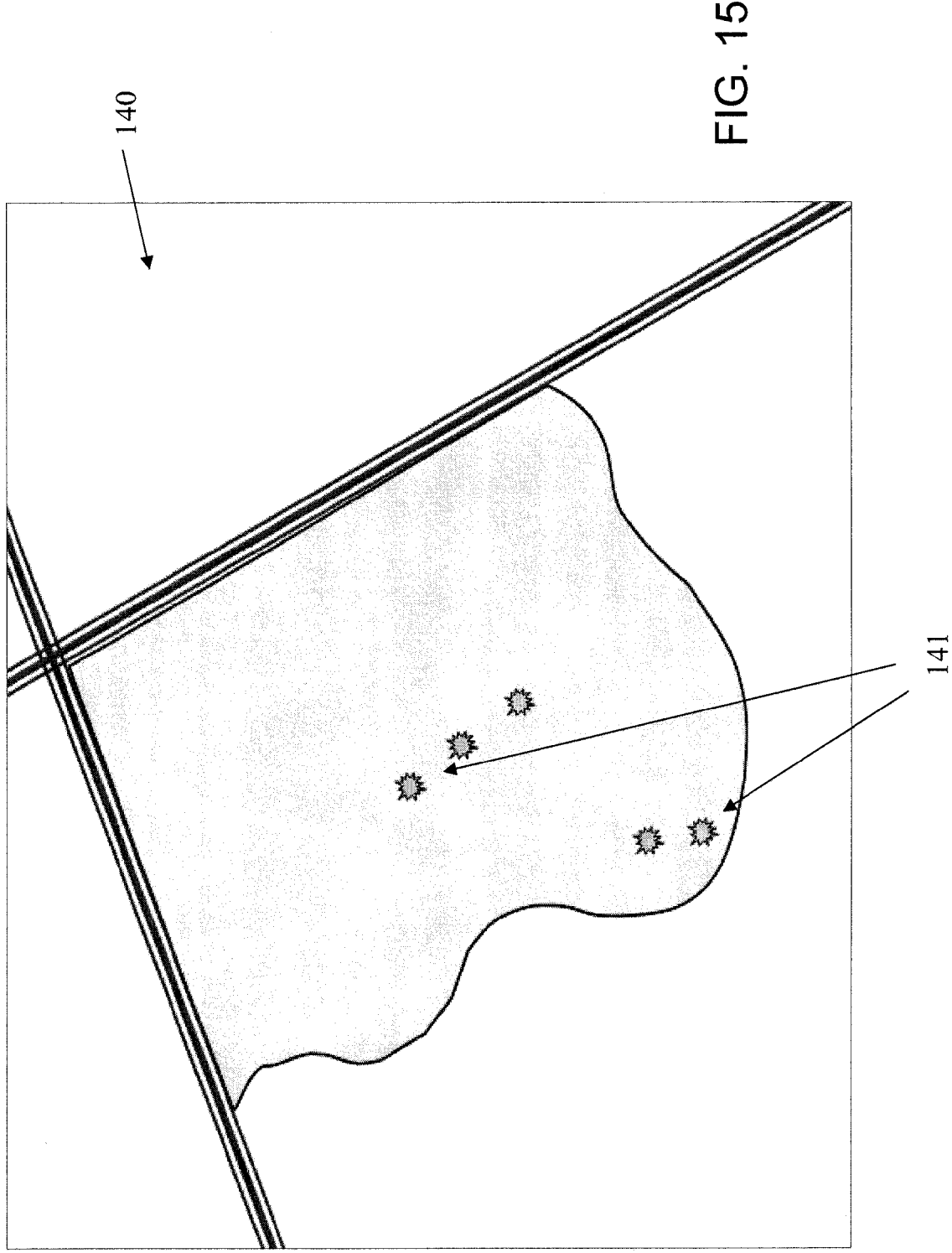
Figure 16:
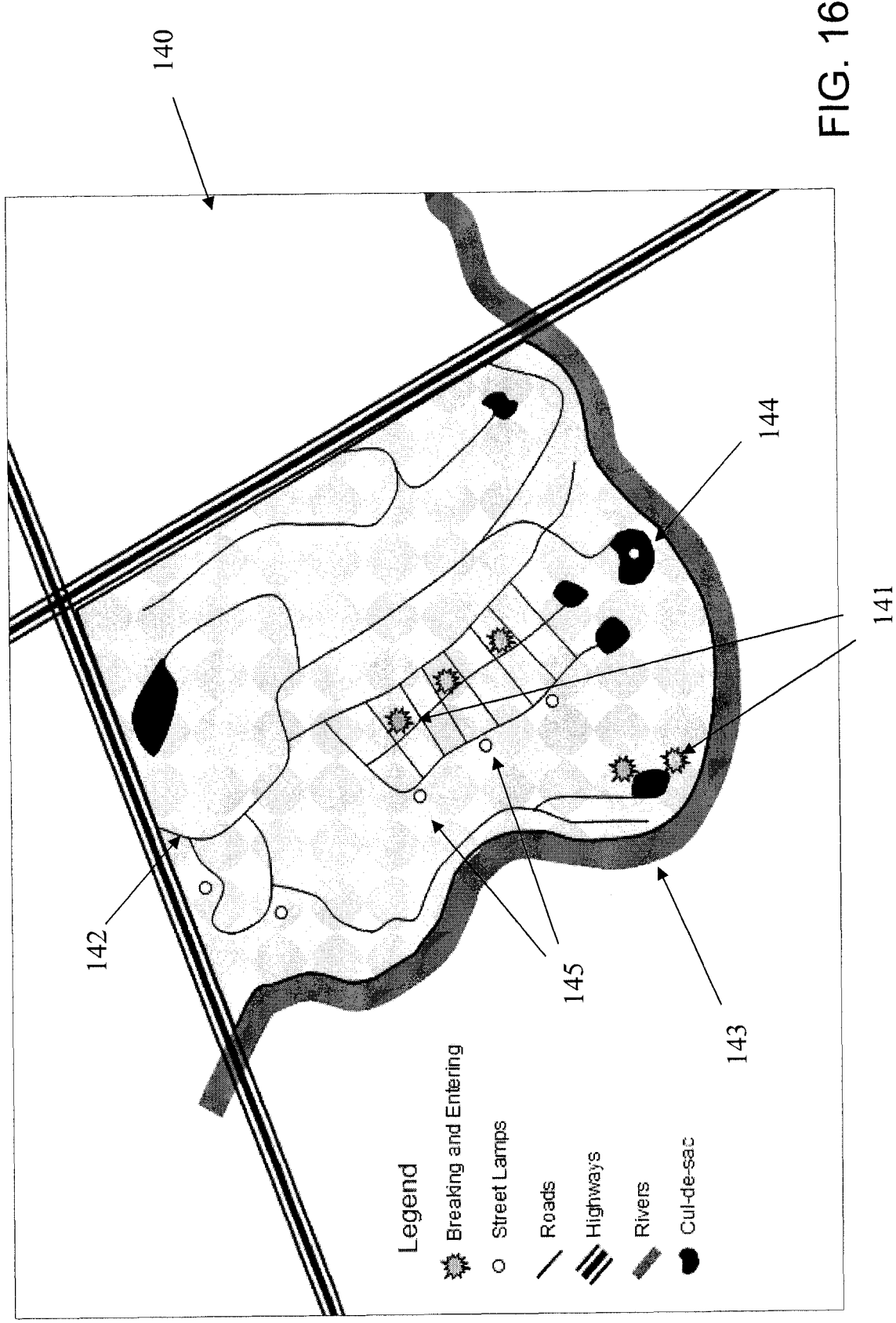

FIG. 14 is an example geographical depiction of an area of interest 140 within User A's city, available through the boundary component of the present invention. As noted by elements 141 in FIG. 15, User A can apply training data from the previous month's breaking and entering offenses onto the area of interest, using training data input component 30. As shown in FIG. 16, User A can then import relevant base layer data from her city as available through layer component. The layers included are "roads" 142, "rivers" 143, "cul-de-sacs" 144, and "street lamps" 145.

Figure 17:
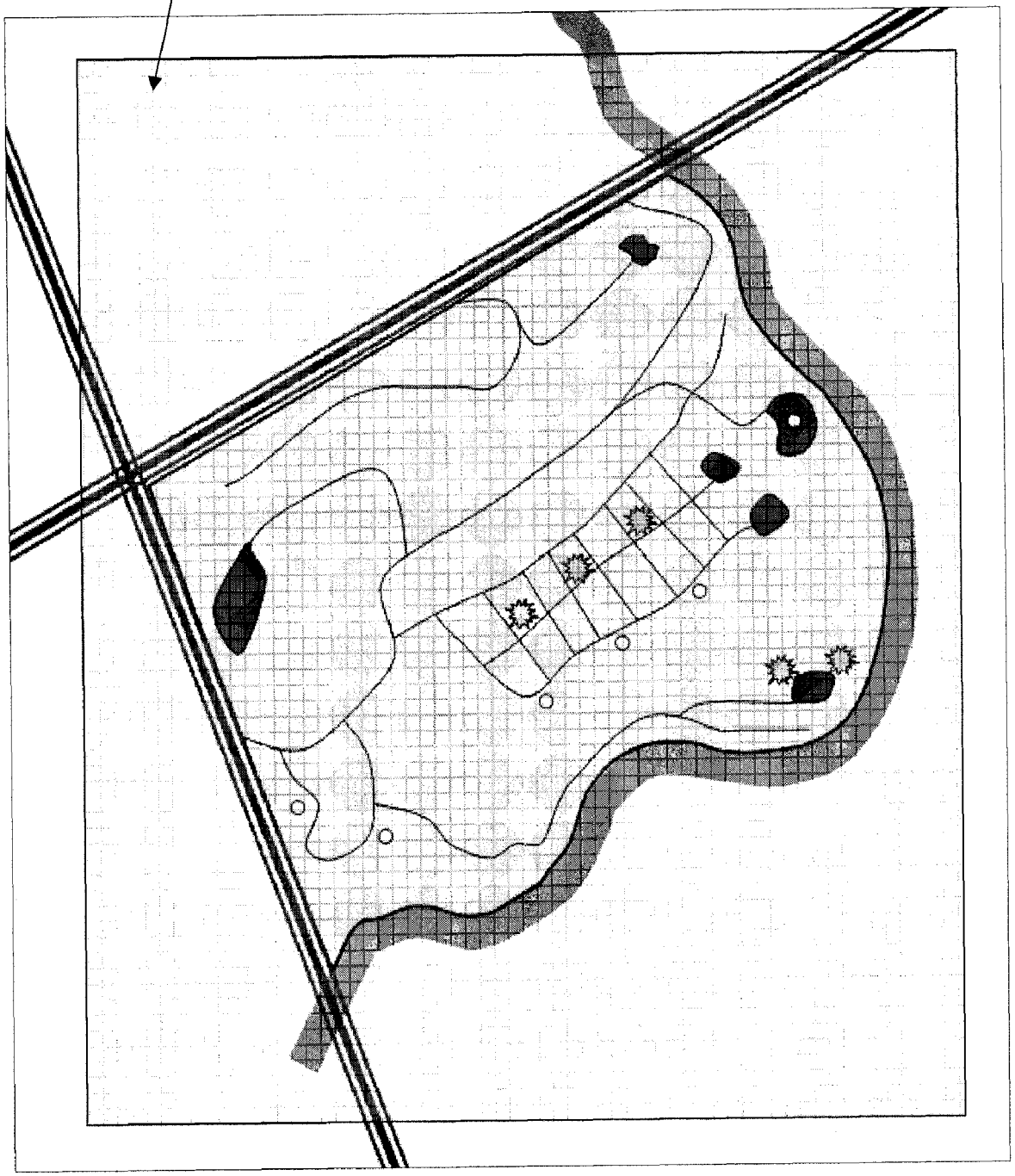

User A can then use the boundary component of the invention to create a uniform grid 14-7 over the city or area of interest 140, as shown in FIG. 17. Next, User A uses the signature derivation component of the present invention to create a signature of breaking and entering events. In one embodiment, this signature is selected to be a collection of probability density functions for the distances to the nearest of each of the features.

For an event i, an estimate of the density at i for the distance to roads is given by $$\hat{f}_i = \sum_{j=1}^{n} \frac{1}{n\sqrt{2\pi\sigma^2}} \exp\left\{\frac{-(dist \text{ from event } j \text{ to nearest road})^2}{2\sigma^2}\right\}$$

Where j denotes the $j^{th}$ event training point where $j=\{1 \ldots n\}$

User A next uses the event likelihood component of the present invention to link the signature of breaking and entering with the regular grid. In one embodiment, the regular grid has been previously analyzed using the function component of the present invention, such that values or functional measurements associated with each cell of the grid have been identified and indexed. For example, a nearest neighbor distance measurement from each cell's center point to the variable of interest (or a feature within the variable of interest, e.g.) will have been determined and stored via the function component. The linking of the derived signature with the regular grid can be performed, in one embodiment, by calculating the distance from each event from the training data to the nearest feature element, and assessing the likelihood score associated with that distance for each feature. In one embodiment, a weighted average of these scores is taken to find the combined score across all features.

Figure 18:
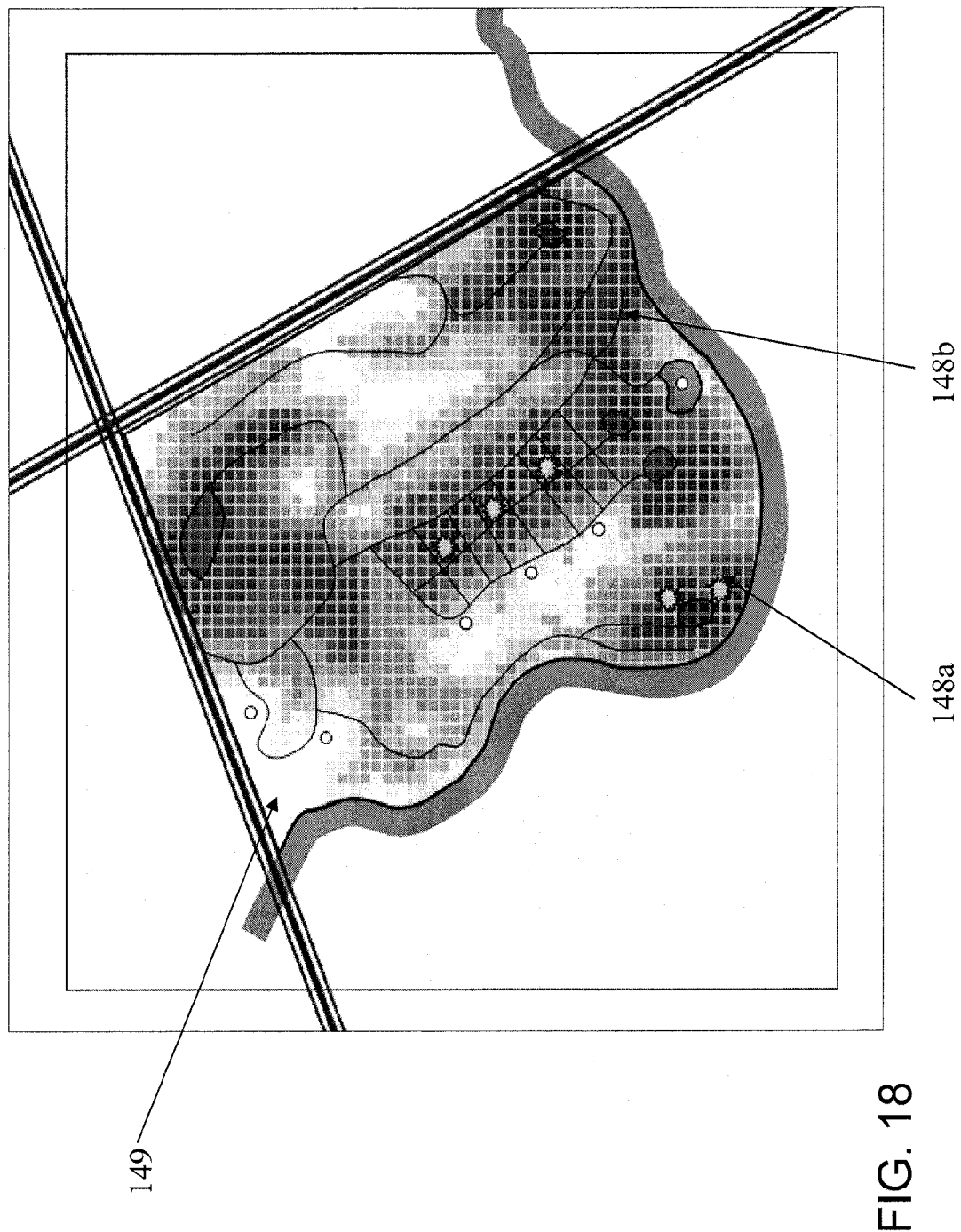

As shown in FIG. 18, User A can then use the assessment element of the invention to shade the resulting assessment according to the likelihood score. In one embodiment, areas of deeper shading such as 148a and 148b, for example, can be used to denote a greater likelihood of such an event occurring in or around that location in the future. On the other hand, areas of lighter or no shading such as 149 can indicate areas where the event is determined to be less likely to occur.

EXAMPLE 2

The following example is provided as an additional illustrative case of the operation of the present invention.

User B is a planning district manager deciding on the best location for a new municipal fire station. There are twenty-two possible neighborhoods in the city where a fire station could be located. User B would like to recommend a location that will place the new fire station in the area most likely to have fire incidents causing a significant amount of damage based on observed data for the previous year. The travel time for an emergency vehicle to the fire location is the primary measure of distance for this task. Data for city locations is stored in a parcel map outlining each identified parcel in the community; these parcels will be used as the output grid for the analysis.

Figure 21:
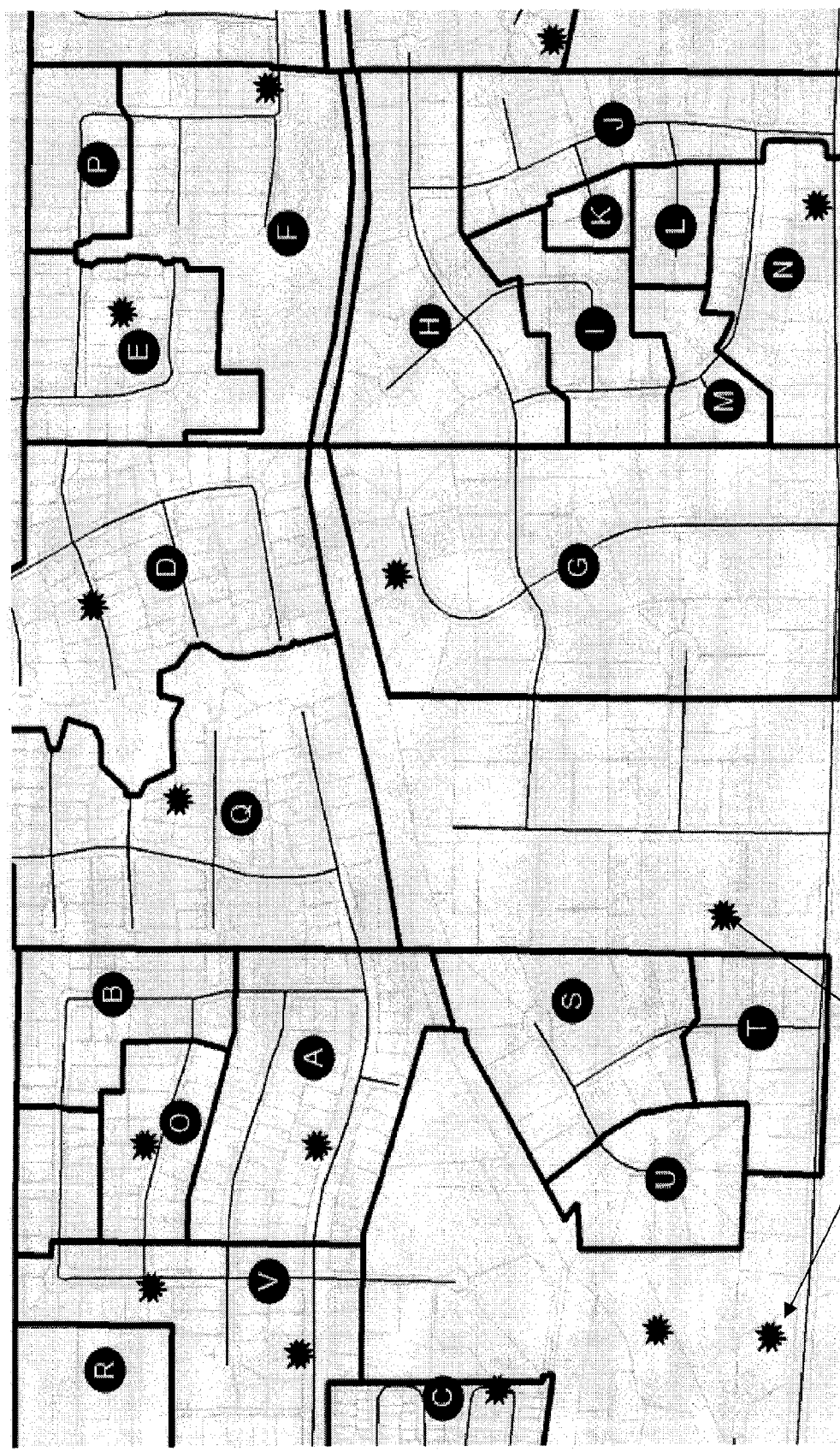
FIGS. 21 through 23 and 25 are graphical depictions of geographical areas of interest as described in connection with an example implementation of the present invention.
Figure 22:
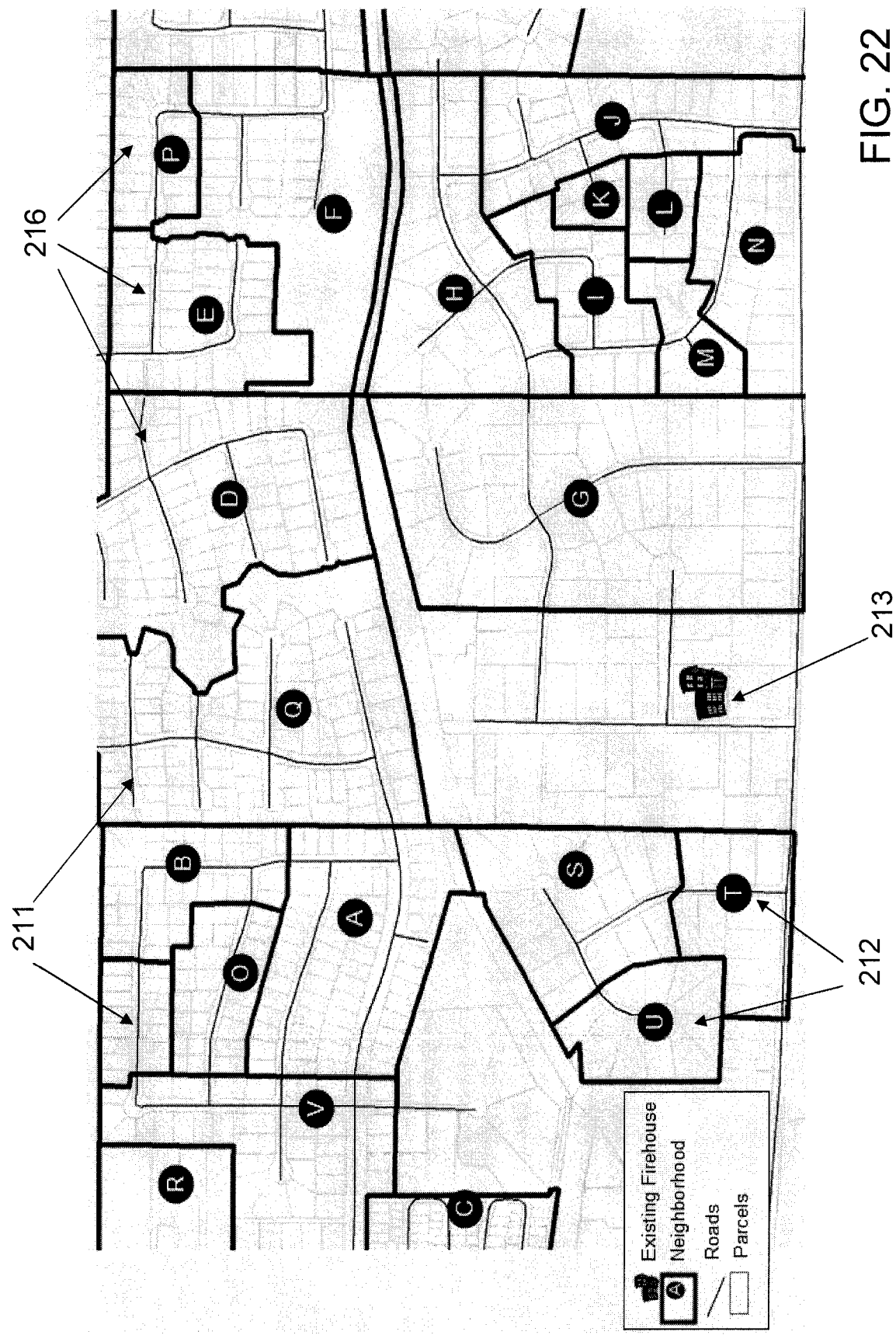

As shown in FIG. 21, User B applies training data 210 from the previous year's house fire incidents. In this example, User B uses the invention to import relevant base layer data from her city. The layers can include, for example "roads" 211, "neighborhoods" 212, "current fire station 213", "housing construction type", and "housing values", as shown in FIG. 22.

Figure 23:
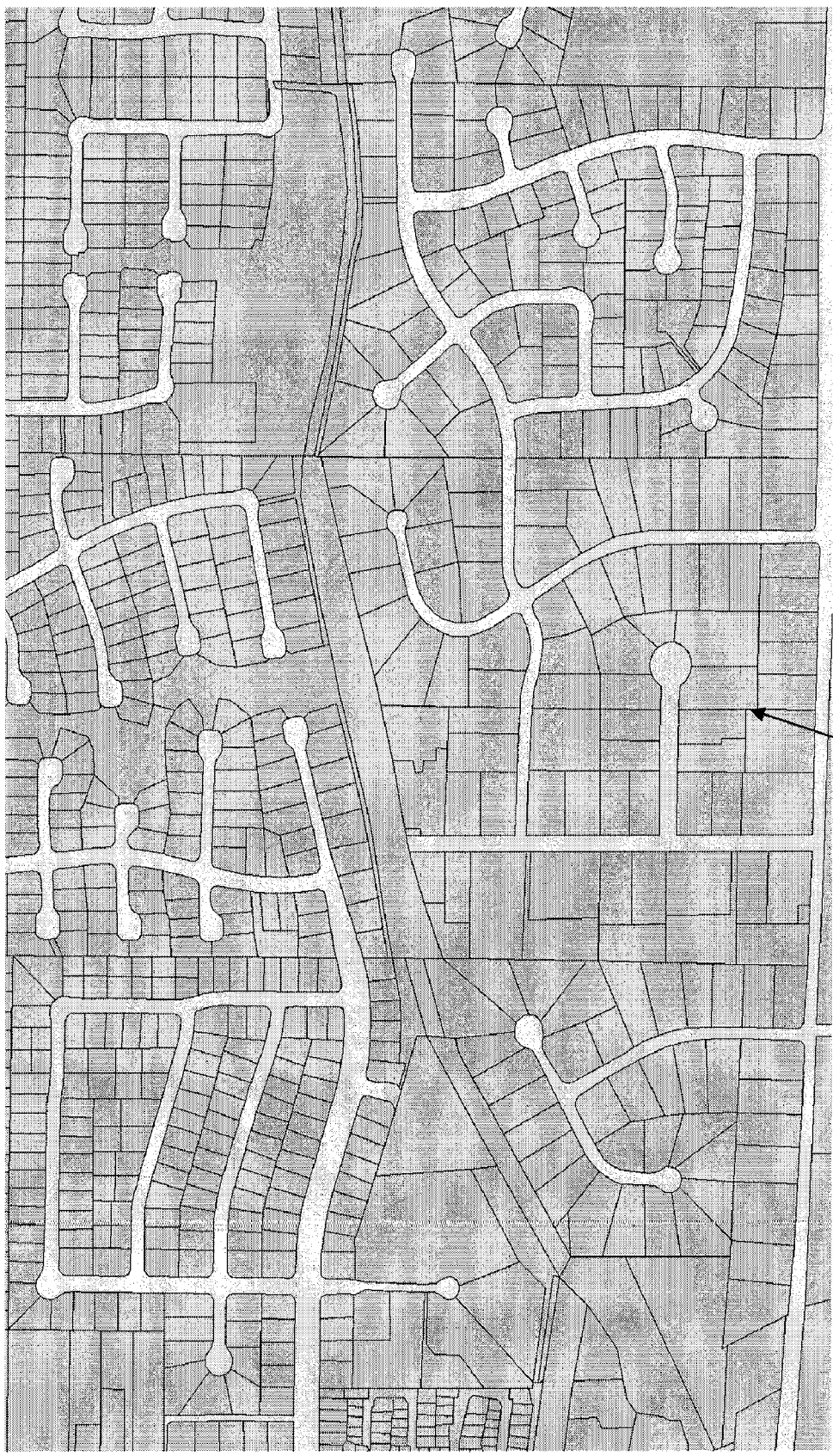

User B uses the invention to select the city parcel layer 215 as the output layer, as shown in FIG. 23. This layer 215 is an irregular grid of shapes 216 (see FIGS. 21 and 22) that define the boundaries of taxable property units. They are useful because they contain construction and value data on the structures that are built on those parcels.

User B can then use the invention to create a signature of residential fire events. This signature is selected to be a collection of probability density functions for the distances to the nearest of each of the features. As an example, the housing construction variable may contain the following proportions:
Stone: 0.20
Brick: 0.20
Wood: 0.60

Figure 24A:
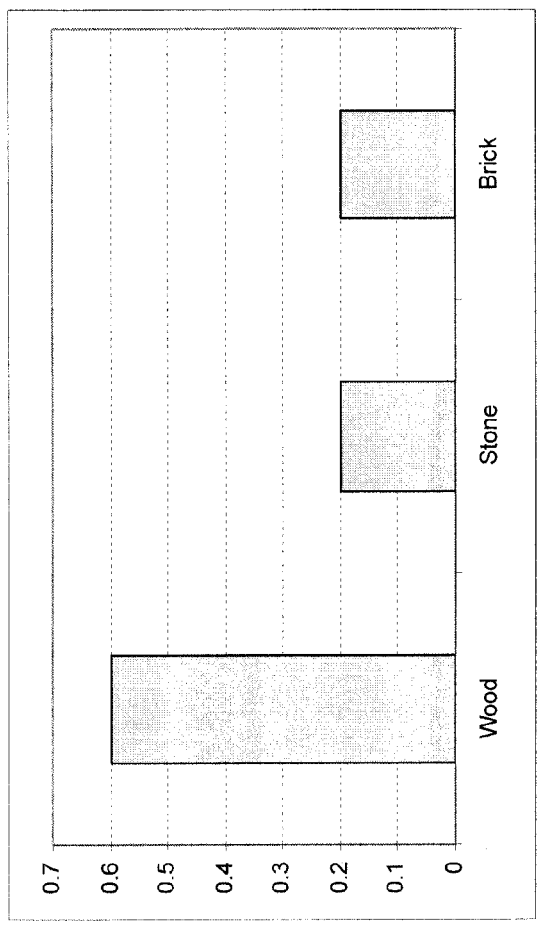
FIG. 24A is an example histogram and FIG. 24B is an example probability density function in accordance with an example implementation of the present invention.
Figure 24B:
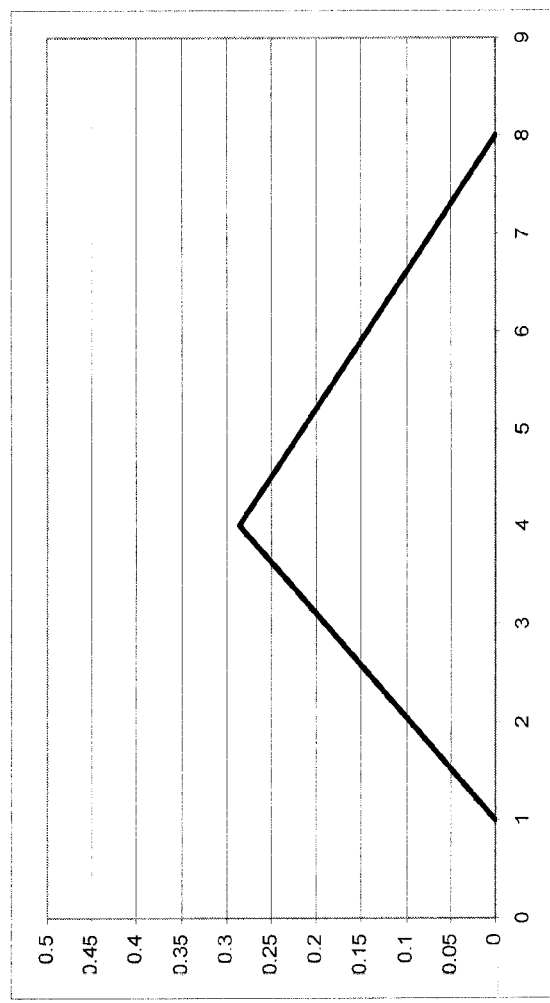
Figure 25:

User B next uses the histogram tool of the present invention to create a manual density function for construction type. FIG. 24A shows a histogram 220 and FIG. 24B shows a triangular distribution (i.e., with min, max, mode). User B then uses the invention to link the signature of high damage house fires with the irregular grid. This linkage is performed by calculating the travel distance along the road network from each parcel grid cell to the nearest feature element and finding the likelihood score associated with that distance for each feature. In one embodiment of the invention as described above, a weighted average of these scores can be taken to find the combined score across all features. User B then uses the invention to shade the resulting assessment according to the likelihood score, as shown in the diagram 225 of FIG. 25. Upon receiving the final assessment, User B can see that neighborhood P is the best location to place the firehouse based on the high vulnerability of houses in that area. User B can also send an alert message using the invention to the fire personnel who operate in that neighborhood. It will be appreciated that alert notifications can also be employed in real-time emergency situations.

EXAMPLE 3

The following example is provided as an additional illustrative case of the operation of the present invention.

User C is a shopping mall designer/manager. The flow of shoppers through the facility and their shopping habits is of interest to User C. C creates a spatial assessment of shopping for electronics making use of the invention. User C realizes that there is far too much traffic concentrated at the south entrance to the shopping mall and wishes to move a portion of the traffic to the north entrance area. User C determines that he can modify the locations of valet parking stations, ATM machines, and mall security stations. By examining the attraction-avoidance index for each feature, User C discovers that ATMs and valet parking are attractor features, while security stations are repellors. User C uses the Spatial Behavior Modification tool to find the best locations for the available features, and determines locations for the ATMs, valet parking, and security stations that equalize traffic between the two entrances without reducing the total shopping traffic at the mall.

Figure 29:
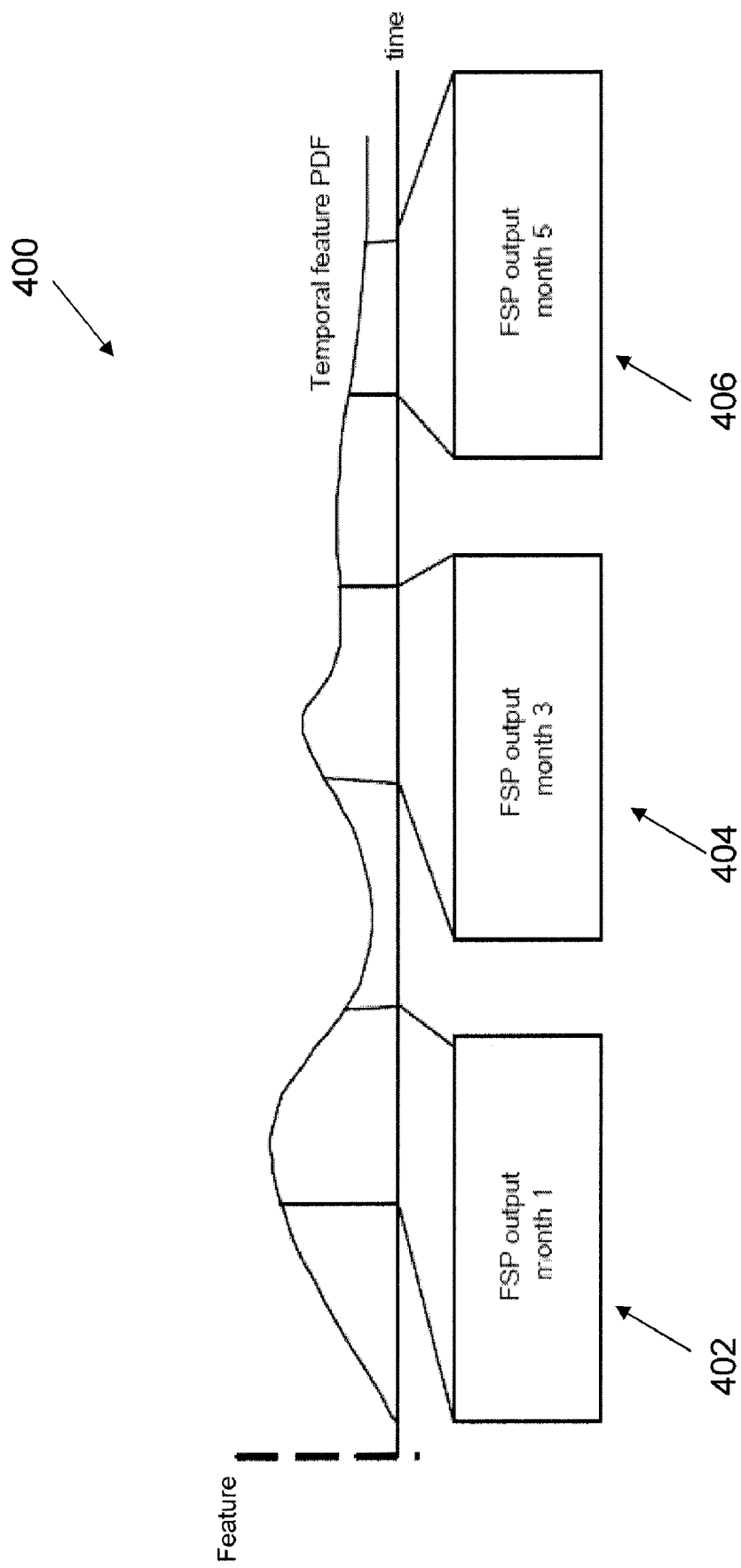
FIG. 29 is a graph showing the projection of temporal feature space likelihood onto successive time windows according to one aspect of the present invention.

In addition to the above, the present invention can apply temporal correlation methods for predictive analysis in wide data. Through extension of the Poisson model, for example, the present invention can denote an entire class of temporal features. Then, for any time window selected, the measurements to those temporal features can be derived computationally. Temporal variables are chosen according to what is appropriate to the problem being addressed. For example, if providing a crime forecast for breaking and entering, the present invention can employ pay periods, vacation times, and holidays as key temporal features. Next, an integrated expected value can be established for the combined spatiotemporal window. This projection into time windows allows one set of input data to produce a varying set of outputs according to a moving time window. For example, as shown in the graph 400 of the probability density function (PDF) for a given feature in FIG. 29, feature space (FSP) output is shown for Month One window at 402, for Month Three window at 404, and for Month Five window at 406.

Figure 30:
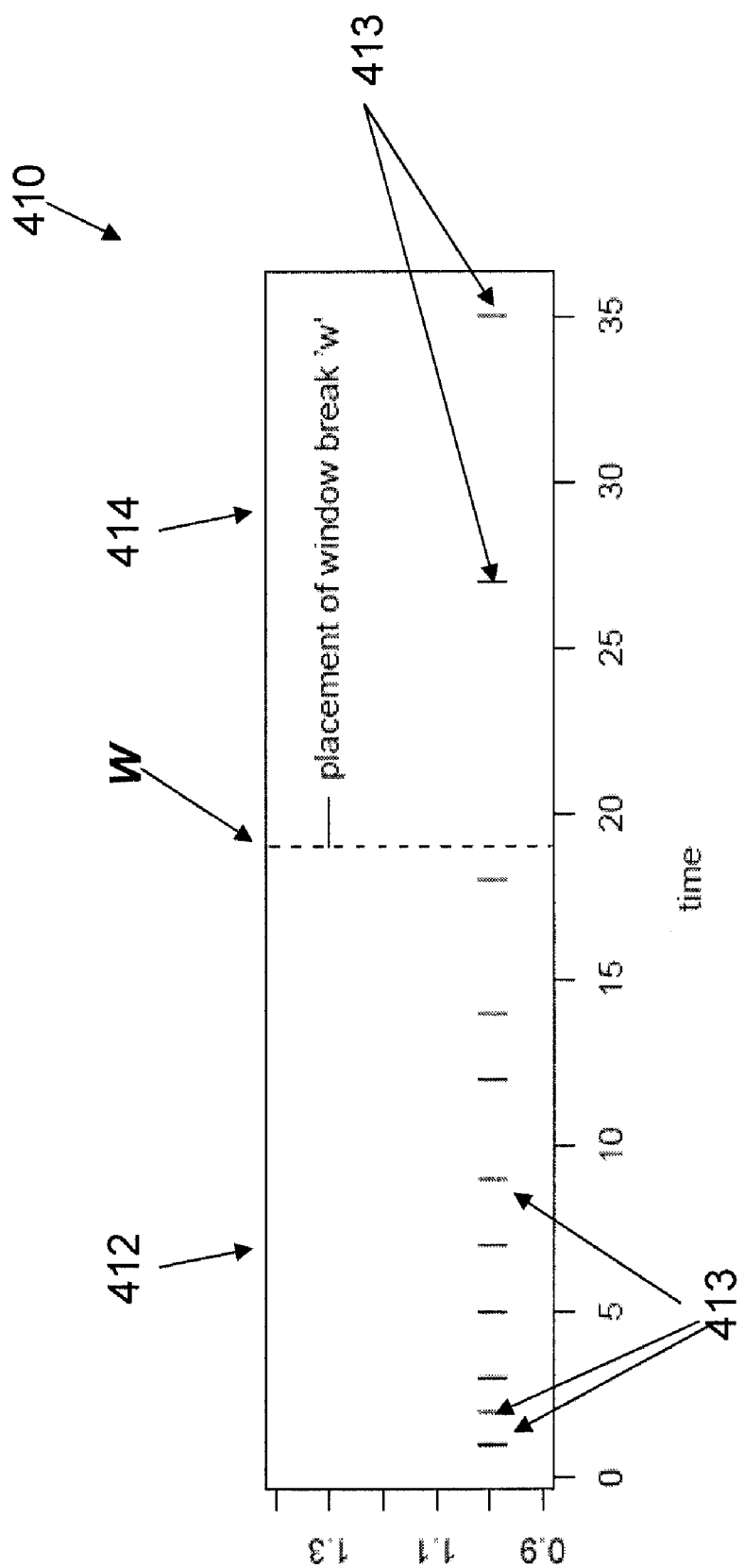
FIG. 30 shows a graph with a window break, illustrating discrepancies between different time segments for a temporal feature.

In order to detect change in the intensity function, the time window boundary W is determined such that the "before" and "after" conditions are at maximum separation as shown in graph 410 in FIG. 30. For instance, time window 412 represents the "before" condition where event instances 413 are more frequent than in time window 414, which represents the "after" condition. The window boundary W separates the more frequent set of instances in window 412 from the less frequent set of instances in window 414. As such, the greatest amount of shift in the intensity function denotes the greatest amount of observed change across a time threshold. This, however, is only useful if a shift in the intensity truly exists.

The expected value of events over some window in space and time can be applied to a spatiotemporal forecasting problem. In order to forecast a number of events in a specified time window and geographic boundary, it requires estimation of the instantaneous probability density at any point in time and space for the specified region. The probability density calculates the intensity of likelihood that a future event will occur over a particular place and time window. This window is then aggregated by an integral function which calculates the conditional probability that a future event will occur in area a at time t. These non-parametric intensity functions require a consistent bandwidth estimator, a set of temporal features across which these functions are estimated, and a set of sample observations that can be measured against those temporal features.

This non-parametric forecasting method is very powerful, and make a significant and novel contribution to the field of forecasting in complex urban environments. The Poisson model is given by:

$$f(n \mid \lambda(s, t)) = e^{-\lambda(s,t)} \lambda(s, t)^n \frac{1}{n!}$$

where $\lambda(s; t)$ is a function of both space and time features. The integral of this equation yields an expected count of events over a specified interval. Thus, for any spatial and temporal window that is chosen, a forecast of the number of events expected in that window can be empirically derived. In order to create an estimate for a particular window of time and space, the estimates for the bounds of the window in each feature vector can be derived, along with the difference. For example, for a window that covers Mar. 1-3, 2011 and from 500 to 1000 m from highways, we find the expected value at the following vectors:

Let:
Y1=0-500 m, Mar. 1, 2011
Y2=0-1000 m, Mar. 1, 2011
Y3=0-500 m, Mar. 3, 2011
Y4=0-1000 m, Mar. 3, 2011
Then, using these values, the differences in the combined vector space, Y4−Y3−Y2+Y1, are determined. The estimate is rounded to the next whole number and is the expected number of events (e.g., insurgent attacks, burglary crimes, etc.). This number is the basis of comparison for the actual numbers that occurred in that window for the purposes of evaluation. The discretized geographic and temporal space can be used to calculate the expected fraction of events that are expected. Then, by summation, the expected number of events can be calculated for any spatial and temporal window. This is due to the Poisson distribution's reproductive property which states that the sum of n independent Poisson variables is also Poisson.

EXAMPLE 4

Figure 31:
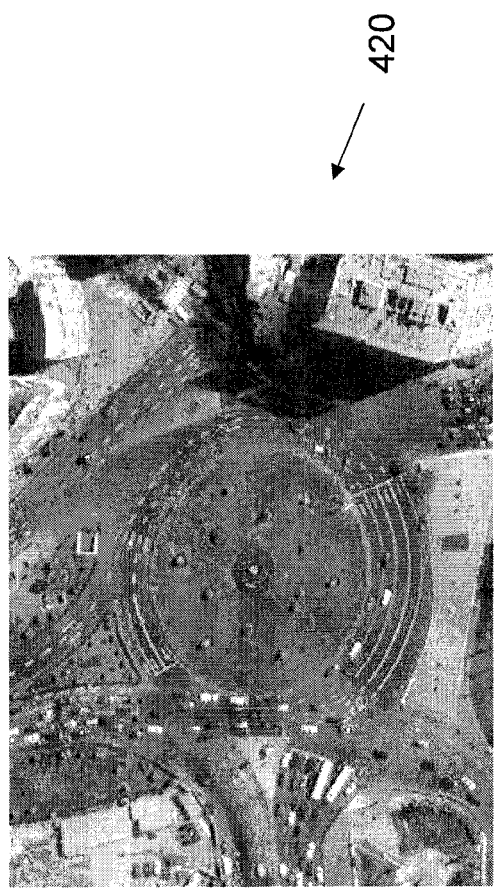
FIGS. 31 and 32 show sample photographic images illustrating crowd level in accordance with an exemplary embodiment of the present invention.
Figure 32:
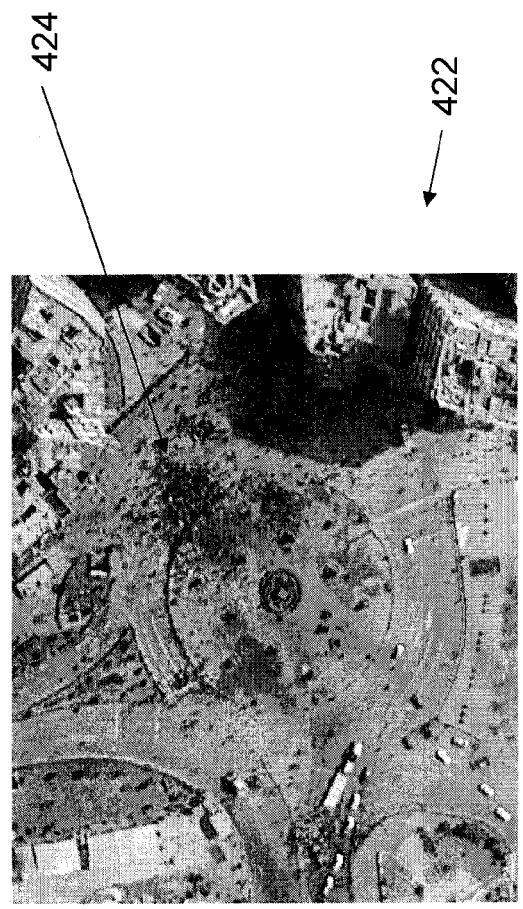

The intensity levels of crowds are closely monitored by law enforcement and media institutions to signal riots, protests, flashmobs, or other events. Imagery at regular intervals is captured and the number of people on the streets is estimated or directly counted. Most days will see some variable in the crowd size, but on a major event, the crowd will be larger, denser, and appear suddenly. It is useful to know exactly when the crowd grows to a level that exceeds statistically normal variations. By employing the non-parametric intensity function estimation described above, the discriminator between normal levels and excessive levels can be clearly and automatically defined. The image 420 shown in FIG. 31 represents a sample photograph taken of Tahrir Square in Cairo, Egypt in January, 2011. The image 422 shown in FIG. 32 represents a sample photograph taken of Tahrir Square in Cairo, Egypt in February, 2011. A large population of people appear at 424 in FIG. 32.

The present invention can assist in forecasting a critical time point for an event such as a riot, protest or other crowd-related event. The critical time point can be, for example, when it may be necessary to increase law enforcement support for an event. In this example, the present invention can designate one or more temporal features, such as, for example, holidays, birthdays or dates of death of historical figures. The present invention can further determine an intensity function representing an expected value of event type instances corresponding to the temporal feature. In one embodiment of the present invention, the intensity function is associated with a geospatial area of interest. For example, the present invention may determine that a large crowd appearing in Tahrir Square has a 1 in 3 million chance of occurring on a typical July day, but a much higher chance of occurring on the birthday of Egypt's former President Sadat. The intensity function can be determined in accordance with the methods for deriving signature patterns described above.

In one embodiment of the present invention, the step of determining an intensity function includes measuring a time period between each occurrence of multiple instances of the event type and the at least one temporal feature. For instance, if a previous riot occurred in Tahrir Square two days after the time of death of an historical political figure, the time period of two days would be a first measurement used in determining the intensity function.

The present invention can further determine a time window break associated with the intensity function, with the window break representing observed change across a time threshold for the temporal feature. Further, the present invention can assess whether the time window break is a critical time point for the event type. Additionally, the one or more temporal features can have before and after conditions as noted above, and the time window break can be determined such that the temporal feature's before and after conditions are at maximum separation. The time window break can further be determined so as to maximize the difference between expected value of event type instances in a first time series, and expected value of event type instances in a second time series.

EXAMPLE 5

Reduction in forested and agricultural land is of concern globally for resource management, as well as population estimation and land use rights. Some amount of growth in population is expected as populations expand and contract due to economic development and recession. One method for estimating forested or vegetation space within aerial or satellite imagery is to use a vegetation index from multispectral images. If one views these images over time, one can see the relative change in vegetation as a result of blight, drought, timber farming, urbanization and many other causes.

If the rate of change rapidly increases, this can indicate a so called "tipping point" in the population expansion, signaling an unsustainable population growth and cause for unrest and resource scarcity. Advance and early warning of these conditions is important to decision makers in government and industry to help quell resource constraints by expanding services and products, or through legislative actions that encourage or reduce population migration.

The present invention can assist in such forecasting by sampling the forest percentage in an area at regular intervals as identified, for example, in Table 2 below.

TABLE 2

| Date | Vegetation % |
|---|---|
| T1 | 98 |
| T2 | 84 |
| T3 | 71 |
| ... | ... |
| T99 | 58 |
| T100 | 37 |

Figure 35:
FIGS. 33 through 37 show sample photographic images illustrating deforestation in accordance with an exemplary embodiment of the present invention.
Figure 34:
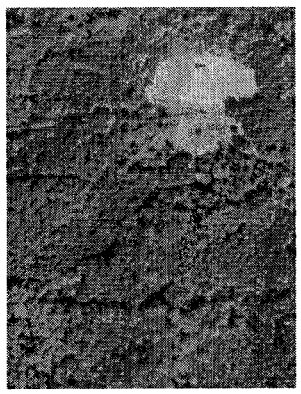
Figure 33:
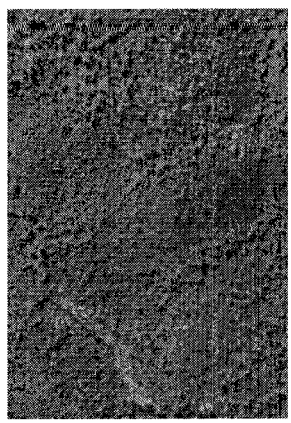
Figure 37:
Figure 36:

The above table values are exemplified in FIGS. 33 through 37. The image 440 shown in FIG. 33 represents T1 with 98% vegetation. The image 442 shown in FIG. 34 represents T2 with 84% vegetation. The image 444 shown in FIG. 35 represents T3 with 71% vegetation. The image 446 shown in FIG. 36 represents T99 with 58% vegetation. The image 448 shown in FIG. 37 represents T100 with 37% vegetation. Through the intensity prediction value, the present invention can detect the window W that maximizes the difference between time series $t_0 \ldots t_w$ and $t_w \ldots t_n$. In this way, the present invention can help identify the tipping point of deforestation in advance of it occurring, and can then facilitate reforestation efforts to reverse any negative trend.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processors, processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed and desired to be secured by Letters Patent is:

1. A method of forecasting a critical time point for an event type, comprising the steps of:
    causing at least one processor to execute a plurality of instructions stored in at least one memory device to designate at least one temporal feature, wherein the temporal feature is designated based upon a correlation between the temporal feature and the event type;
    causing the at least one processor to execute a plurality of instructions stored in the at least one memory device to determine an intensity function representing an expected value of event type instances corresponding to the temporal feature;
    causing the at least one processor to execute a plurality of instructions stored in the at least one memory device to determine a time window break associated with the intensity function, the window break representing observed change across a time threshold for the temporal feature; and causing the at least one processor to execute a plurality of instructions stored in the at least one memory device to assess whether the time window break is a critical time point for the event type.

2. A method of forecasting a critical time point for an event type, comprising the steps of:

causing at least one processor to execute a plurality of instructions stored in at least one memory device to designate at least one temporal feature;

causing the at least one processor to execute a plurality of instructions stored in the at least one memory device to determine an intensity function representing an expected value of event type instances corresponding to the temporal feature, wherein the step of determining an intensity function includes measuring a time period between each occurrence of multiple instances of the event type and the at least one temporal feature;

causing the at least one processor to execute a plurality of instructions stored in the at least one memory device to determine a time window break associated with the intensity function, the window break representing observed change across a time threshold for the temporal feature; and causing the at least one processor to execute a plurality of instructions stored in the at least one memory device to assess whether the time window break is a critical time point for the event type.

3. The method of claim 2 wherein the step of measuring is performed based upon at least one past instance of the event type.

4. A method of forecasting a critical time point for an event type, comprising the steps of:

causing at least one processor to execute a plurality of instructions stored in at least one memory device to designate at least one temporal feature, wherein the at least one temporal feature has before and after conditions;

causing the at least one processor to execute a plurality of instructions stored in the at least one memory device to determine an intensity function representing an expected value of event type instances corresponding to the temporal feature;

causing the at least one processor to execute a plurality of instructions stored in the at least one memory device to determine a time window break associated with the intensity function, the window break representing observed change across a time threshold for the temporal feature, and wherein the time window break is determined such that the at least one temporal feature's before and after conditions are at maximum separation; and causing the at least one processor to execute a plurality of instructions stored in the at least one memory device to assess whether the time window break is a critical time point for the event type.

5. A method of forecasting a critical time point for an event type, comprising the steps of:

causing at least one processor to execute a plurality of instructions stored in at least one memory device to designate at least one temporal feature;

causing the at least one processor to execute a plurality of instructions stored in the at least one memory device to determine an intensity function representing an expected value of event type instances corresponding to the temporal feature, wherein the intensity function is a probability density function;

causing the at least one processor to execute a plurality of instructions stored in the at least one memory device to determine a time window break associated with the intensity function, the window break representing observed change across a time threshold for the temporal feature; and causing the at least one processor to execute a plurality of instructions stored in the at least one memory device to assess whether the time window break is a critical time point for the event type.

6. A method of forecasting a critical time point for an event type, comprising the steps of:

causing at least one processor to execute a plurality of instructions stored in at least one memory device to designate at least one temporal feature;

causing the at least one processor to execute a plurality of instructions stored in the at least one memory device to determine an intensity function representing an expected value of event type instances corresponding to the temporal feature, wherein the step of determining an intensity function is associated with a geospatial area of concern;

causing the at least one processor to execute a plurality of instructions stored in the at least one memory device to determine a time window break associated with the intensity function, the window break representing observed change across a time threshold for the temporal feature; and causing the at least one processor to execute a plurality of instructions stored in the at least one memory device to assess whether the time window break is a critical time point for the event type.

7. A method of forecasting a critical time point for an event type, comprising the steps of:

causing at least one processor to execute a plurality of instructions stored in at least one memory device to designate at least one temporal feature;

causing the at least one processor to execute a plurality of instructions stored in the at least one memory device to determine an intensity function representing an expected value of event type instances corresponding to the temporal feature;

causing the at least one processor to execute a plurality of instructions stored in the at least one memory device to determine a time window break associated with the intensity function, the window break representing observed change across a time threshold for the temporal feature, wherein the time window break is determined so as to maximize the difference between expected value of event type instances in a first time series, and expected value of event type instances in a second time series; and causing the at least one processor to execute a plurality of instructions stored in the at least one memory device to assess whether the time window break is a critical time point for the event type.

8. A system for forecasting a critical time point for an event type, comprising:

a processor; and a non-transitory computer-readable medium including instructions that, when executed by the processor perform a method, the method comprising:

designating at least one temporal feature, wherein the temporal feature is designated based upon a correlation between the temporal feature and the event type;

determining an intensity function representing an expected value of event type instances corresponding to the temporal feature;

determining a time window break associated with the intensity function, the window break representing observed change across a time threshold for the temporal feature; and assessing whether the time window break is a critical time point for the event type.

9. A system for forecasting a critical time point for an event type, comprising:

a processor; and a non-transitory computer-readable medium including instructions that, when executed by the processor perform a method, the method comprising:

designating at least one temporal feature;

determining an intensity function representing an expected value of event type instances corresponding to the temporal feature, wherein determining an intensity function includes measuring a time period between each occurrence of multiple instances of the event type and the at least one temporal feature;

determining a time window break associated with the intensity function, the window break representing observed change across a time threshold for the temporal feature; and assessing whether the time window break is a critical time point for the event type.

10. The system of claim 9 wherein the step of measuring is performed based upon at least one past instance of the event type.

11. A system for forecasting a critical time point for an event type, comprising:

a processor; and a non-transitory computer-readable medium including instructions that, when executed by the processor perform a method, the method comprising:

designating at least one temporal feature, wherein the at least one temporal feature has before and after conditions;

determining an intensity function representing an expected value of event type instances corresponding to the temporal feature;

determining a time window break associated with the intensity function, the window break representing observed change across a time threshold for the temporal feature, and wherein the time window break is determined such that the at least one temporal feature's before and after conditions are at maximum separation; and assessing whether the time window break is a critical time point for the event type.

12. A system for forecasting a critical time point for an event type, comprising:

a processor; and a non-transitory computer-readable medium including instructions that, when executed by the processor perform a method, the method comprising:

designating at least one temporal feature;

determining an intensity function representing an expected value of event type instances corresponding to the temporal feature, wherein the intensity function is a probability density function;

determining a time window break associated with the intensity function, the window break representing observed change across a time threshold for the temporal feature; and assessing whether the time window break is a critical time point for the event type.

13. A system for forecasting a critical time point for an event type, comprising:

a processor; and a non-transitory computer-readable medium including instructions that, when executed by the processor perform a method, the method comprising:

designating at least one temporal feature;

determining an intensity function representing an expected value of event type instances corresponding to the temporal feature, wherein the step of determining an intensity function is associated with a geospatial area of concern;

determining a time window break associated with the intensity function, the window break representing observed change across a time threshold for the temporal feature; and assessing whether the time window break is a critical time point for the event type.

14. A system for forecasting a critical time point for an event type, comprising:

a processor; and a non-transitory computer-readable medium including instructions that, when executed by the processor perform a method, the method comprising:

designating at least one temporal feature;

determining an intensity function representing an expected value of event type instances corresponding to the temporal feature;

determining a time window break associated with the intensity function, the window break representing observed change across a time threshold for the temporal feature, wherein the time window break is determined so as to maximize the difference between expected value of event type instances in a first time series, and expected value of event type instances in a second time series; and assessing whether the time window break is a critical time point for the event type.

* * * * *